United States Patent
Van Bruggen et al.

(10) Patent No.: US 12,127,518 B2
(45) Date of Patent: Oct. 29, 2024

(54) GREENHOUSE ENVIRONMENT OPTIMIZATION

(71) Applicant: Source.ag International B.V., Amsterdam (NL)

(72) Inventors: Ernst Frederik Jacobus Van Bruggen, Amsterdam (NL); Cédric Cyril Canovas, Amsterdam (NL); Rien Arthur Kamman, Amsterdam (NL); Paula Luiza Amaral Santos, Amsterdam (NL)

(73) Assignee: Source.ag International B.V., Amsterdam (NL)

( * ) Notice: Subject to any disclaimer, the term of this patent is extended or adjusted under 35 U.S.C. 154(b) by 0 days.

(21) Appl. No.: 18/397,391

(22) Filed: Dec. 27, 2023

(65) Prior Publication Data

US 2024/0130300 A1      Apr. 25, 2024

Related U.S. Application Data

(63) Continuation-in-part of application No. PCT/EP2023/071347, filed on Aug. 1, 2023.

(30) Foreign Application Priority Data

Aug. 2, 2022   (EP) .................................. 22188392

(51) Int. Cl.
    *A01G 9/14*    (2006.01)
    *G05B 15/02*   (2006.01)

(52) U.S. Cl.
    CPC ............. *A01G 9/143* (2013.01); *G05B 15/02* (2013.01)

(58) Field of Classification Search
    CPC .............................. A01G 9/143; G05B 15/02
    See application file for complete search history.

(56) References Cited

U.S. PATENT DOCUMENTS

2016/0291577 A1* 10/2016 Yatabe .................. G05B 15/02
2017/0345208 A1* 11/2017 Ashdown ............... H05B 47/11
(Continued)

FOREIGN PATENT DOCUMENTS

| WO | 2019049048 A1 | 3/2019 |
| WO | 2019162192 A1 | 8/2019 |
| WO | 2020084414 A1 | 4/2020 |

OTHER PUBLICATIONS

International Search Report and Written Opinion in corresponding International application No. PCT/EP2023/071347 dated Oct. 2, 2023.

*Primary Examiner* — Henry T Crenshaw
(74) *Attorney, Agent, or Firm* — Steven M. Koehler; Westman, Champlin & Koehler, P.A.

(57) ABSTRACT

Methods and systems are disclosed for optimizing a greenhouse environment. The method comprises determining environmental targets for the greenhouse environment, and determining environmental actions based on the determined environmental targets. The determination of the environmental targets comprises receiving plant status data indicative of observable characteristics of plant(s), receiving long-term constraint(s) indicative of long-term predictions of a first set of external circumstances, and determining environmental targets, based on the plant status data and the long-term constraint(s). The determination of the environmental actions comprises receiving short-term constraint(s) indicative of current values and/or short-term predictions of a second set of external circumstance, receiving greenhouse environment sensor data, and determining environmental actions based on the environmental targets, the short-term constraint(s), and the sensor data, the environmental actions comprising rules for operating a greenhouse environment installation. The determination of the environmental targets (Continued)

and the determination of the environmental actions comprises extremising an objective function.

18 Claims, 19 Drawing Sheets

(56) References Cited

U.S. PATENT DOCUMENTS

| | | | |
|---|---|---|---|
| 2018/0343810 A1* | 12/2018 | Counne | A01G 9/022 |
| 2019/0170718 A1* | 6/2019 | Miresmailli | G01D 11/30 |
| 2019/0259108 A1 | 8/2019 | Bongartz et al. | |
| 2020/0134741 A1 | 4/2020 | Bongartz et al. | |
| 2020/0184153 A1* | 6/2020 | Bongartz | A01G 9/24 |
| 2020/0196535 A1 | 6/2020 | Dagondon et al. | |

\* cited by examiner

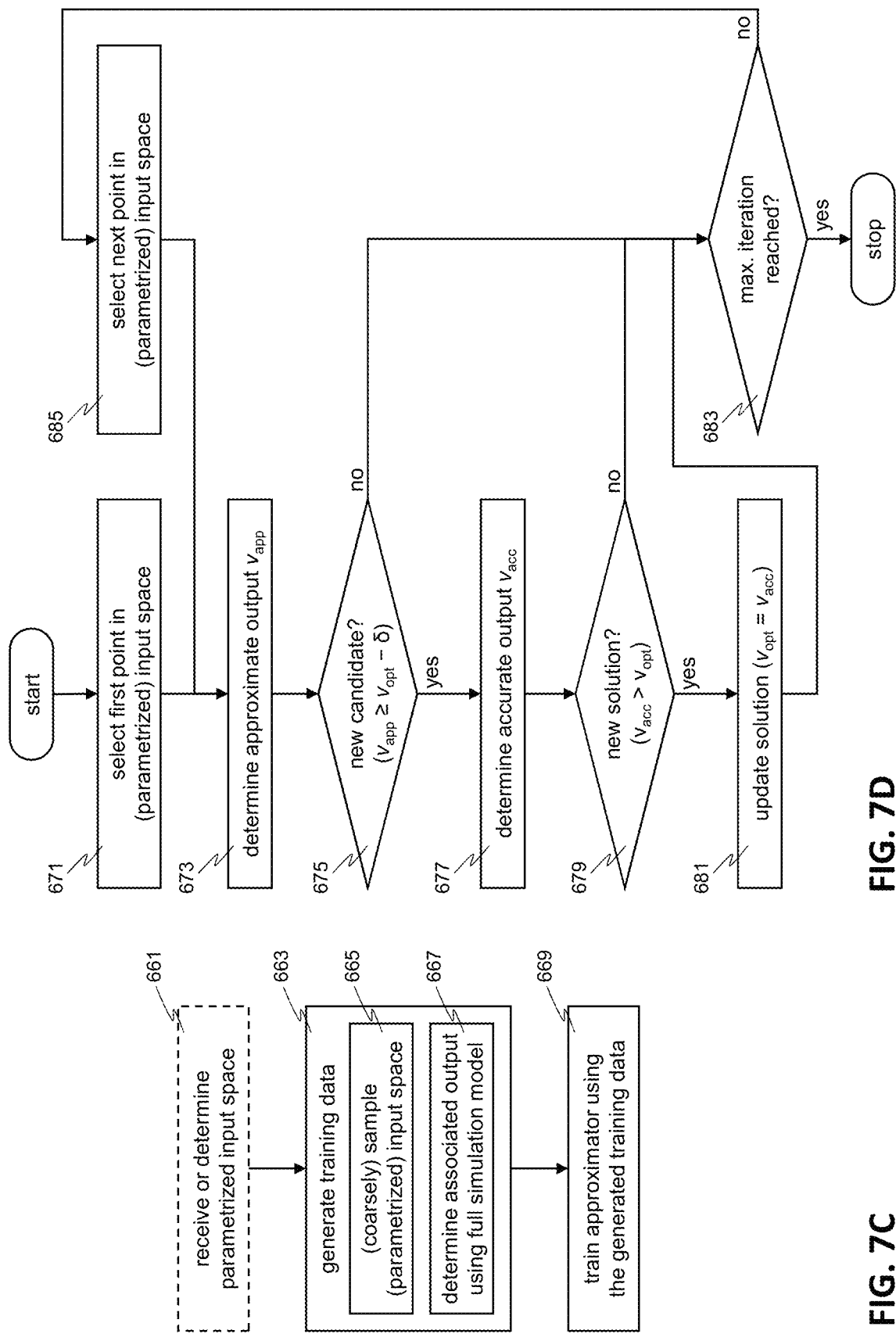

GREENHOUSE ENVIRONMENT OPTIMIZATION

CROSS-REFERENCE TO RELATED APPLICATIONS

The present application is a Continuation-in-Part of International Application No. PCT/EP2023/071347, filed Aug. 1, 2023, and further claims priority to European patent application no. 22188392.9, filed Aug. 2, 2022.

TECHNICAL FIELD

This disclosure relates to optimizing a greenhouse environment, and in particular, though not exclusively, to methods and systems for optimizing a greenhouse environment, and to a computer program product enabling a computer system to perform such methods.

BACKGROUND

Globally, demand for food is increasing. However, climate change is making food production more challenging and less reliable. Moreover, an increased care for the environment leads to demands to use less resources such as fertilizer and pesticides. Therefore, more efficient and more reliable farming methods are necessary.

This may be provided by indoor farms, such as greenhouses. In the face of climate change, indoor farms provide higher food security under increasingly challenging weather conditions, as they can protect crops against extreme heat, cold, rainfall and pests. Indoor farmed fruit and vegetables require up to 20 times less water compared to traditional farming. This can help reduce water usage required for food production. Additionally, by creating optimal growth conditions for plants nearly all year round, indoor farms can produce up to 15 times more yield than under field conditions. Moreover, indoor farms eliminate fertilizer run-off (as excess fertilizer is recycled and reused) and limits the use of pesticides. In contrast, in an average agricultural field about 50% of the nitrogen from fertilizers ends up in waterways while pesticides use cannot be contained, causing various environmental problems.

Thus, indoor farms may lead to safer, more reliable and climate-resilient food production. Nevertheless, in order to grow sufficient fruit and vegetables to nourish the world's growing population in a durable, resource efficient manner, greenhouse efficiency needs to be increased.

However, greenhouse crop production is a highly orchestrated combination of complex biological, environmental, mechanical and managerial systems organized to produce crops to meet market demands. A fundamental challenge is to maintain the environment to manage the plant growth while efficiently using natural resources. The control system is typically based on an array of sensors providing input, a software program for processing the input and determining output signals that direct the physical environmental control systems (e.g., heater, cooler, irrigator) to meet the immediate plant growth needs in response to the fluctuation of natural outside environment. Computer-controlled environments initially came to practice in the 1980s and 1990s and were programmed to satisfy the basic growers' view of plant environmental needs—that is, given a crop, knowing (or guessing) its needs, meet its daytime and night-time greenhouse air temperature requirements—continually and consistently—for every hour of every day from seed until harvest. The plant's needs were based on experience, and thus highly dependent on the skill and experience of the farmer.

Thus, optimizing greenhouse efficiency is a very hard problem. Optimal conditions in the greenhouse may depend on the outside weather over multiple weeks or months, which cannot be predicted in a reliable manner. Furthermore, decisions relating to plants may have long-lasting effects. This starts with the number of stems per area that is planted, but also includes, e.g., pruning decisions and decisions regarding the greenhouse environment, e.g., climate, irrigation, et cetera. For example, pruning a truss of tomatoes as it flowers, affects the yield about eight weeks later.

Hence, from the above, it follows that there is a need in the art for methods and systems for optimizing greenhouse efficiency.

SUMMARY

In a first aspect, this disclosure relates to a method for optimizing control of a greenhouse environment installation of a greenhouse. The method comprises determining environmental targets for a greenhouse environment in the greenhouse, and determining environmental actions for the greenhouse environment installation based on the determined environmental targets. The determination of the environmental targets comprises receiving plant status data indicative of observable characteristics of one or more plants being grown in the greenhouse. The plants may, at a current and/or future point in time, comprise a harvestable part (e.g., fruits), and a productive part (e.g., leaves). A plant growth and development model may be updated based on the plant status data. The plant growth and development model may be configured to separately generate a first prediction for a growth and development of the harvestable part of the plant, and a second prediction for a growth and development of the productive part of the plant. The first prediction for the growth and development of the harvestable part may be substantially different than the second prediction for the growth and development of the productive part. The determination of the environmental targets further comprises receiving one or more long-term constraints indicative of long-term predictions of a first set of external circumstances, and determining environmental targets, based on the plant status data and/or on the first prediction for the growth and development of the harvestable part and/or the second prediction for the growth and development of the productive part, and on the one or more long-term constraints. The determination of the environmental actions comprises receiving one or more short-term constraints indicative of current values and/or short-term predictions of a second set of external circumstance, receiving sensor data indicative of the greenhouse environment, and determining environmental actions based on the environmental targets, the one or more short-term constraints, and the sensor data, the environmental actions comprising rules, e.g., computer instructions, for operating the greenhouse environment installation. The determination of the environmental targets and the determination of the environmental actions comprises extremising at least one objective function. The at least one objective function may, for the determination for the environmental targets, be a function of the prediction for the growth and development of the harvestable part and of the prediction for the growth and development of the productive part. The method may further comprise sending control signals to a controller of the greenhouse environment installation, the control signals configuring the controller to cause the greenhouse environment installation to perform the environmental actions.

Thus, the optimization may be split in two parts, a long-term part and a short-term part. The long-term optimization part may be configured to determine environmental targets that result in an optimal yield, which may be weeks or months away, using a plant model that models both the productive and harvestable parts of the plant. The productive parts of the plant are typically parts that are not harvested and contribute to the production of assimilates in the plant, such as leaves, roots, stems and branches, et cetera. The harvestable parts are typically the fruits or flowers, but can also be a different part of the plant. For ease of reference, such plants may be referred to as fruit-bearing plants. The short-term part may be configured to determine environmental actions that result in an optimal implementation of the environmental targets over, typically, a range of hours to days, e.g., a single day. Thus, e.g., the method may result in environmental actions that maximize (long-term) production or profit, while having limits on (both long-term and short-term) energy usage, plant health (taking into account both the productive and harvestable parts), costs, or other constraints.

The determination of the environmental targets may be explicit or implicit. The long-term and short-term parts may also be referred to as low-frequency and high-frequency parts, respectively.

Examples of plant status data are: number of leaves per stem, size of leaves, ripeness (e.g., measured by color) of fruits. As used herein, the term 'fruit' refers to the commercially relevant part of the plant and may include plant parts that are not considered fruits from a botanical or culinary perspective, e.g., accessory fruits, nuts, and vegetables. As used herein, a fruit-bearing plant may be a plant of which the fruits (or other harvestable part) can be harvested, leaving a substantial part of the plant intact, so that several harvests from the same plant are possible. These may be more or less continuous harvests (e.g., every day or week, the fruits that are harvestable—e.g., sufficiently ripe—at that moment are harvested), or periodic harvests (e.g., every one or two months, or every year, all fruits are harvested). Of course, a combination is also possible (e.g., once every year, over a period of one to a few months, the then harvestable fruits are harvested on, e.g., a daily or weekly basis). It is noted that the harvestable part is not always present on the plant, but may, e.g., only be seasonally present, or may only be present after some initial amount of time has passed.

The prediction of the growth and development of a harvestable or productive part of the plant may take the form of a predicted growth and development curve for the harvestable or productive part of the plant, respectively. Such a curve (or trajectory) may describe the predicted growth and development of a harvestable or productive part, or an element thereof, over time. In some embodiments, the prediction is based on a plurality of growth and development curves, e.g., different curves for different parts and/or for different elements of those parts. Although described as "growth and development" curves, such curves may also relate to only the growth or only the development of a part or element thereof. Examples of growth and development curves are curves describing the number of fruits per unit (e.g., per plant, per area, or per volume), the ripeness of the fruits, the number of leaves per unit (e.g., per stem, per area, per volume), the size of the leaves, et cetera. The predictions of the growth and development of the harvestable and productive parts can be substantially different, for example, if there is no linear relationship between the predictions.

Examples of long-term constraints are weather forecast data, e.g. one or two weeks up to several months ahead, price forecast data for e.g. energy or $CO_2$. Examples of short-term constraints are the current weather or daily weather forecast and the current energy prices.

Examples of environmental actions are climate actions, irrigation actions, pest control actions, et cetera. Examples of climate actions are actions which affect the climate in the greenhouse, e.g., opening or closing windows, turning heating on or off, turning on or off artificial radiation (lights), opening or closing blinds, injecting $CO_2$, et cetera. Unless otherwise specified, radiation refers to photosynthetic active radiation. Examples of irrigation actions are actions which affect the irrigation in the greenhouse, e.g., releasing an irrigation shot, adding nutrients to the irrigation fluid, et cetera. Examples of pest control actions are actions which aim to reduce the presence, or at least the effects of pests on the plants in the greenhouse, e.g., spraying pesticides, releasing pest controlling insects such as ladybugs or parasitic wasps, et cetera.

Extremising an objective function may comprise maximizing or minimising the objective function. Maximizing or minimising a function includes finding an approximate maximum or minimum, e.g., a local maximum/minimum for which there is, within a given probability, no local maximum/minimum that is more than a given amount larger/smaller within a given distance. An objective function is typically defined as a sum, wherein each term is an increasing function (often monotone increasing function) of some quantity. In this context, such an increasing function may be referred to as a metric of that quantity.

As plants need time to grow, current changes in environment (e.g., climate and/or irrigation) may have effect on plant development weeks ahead. For example, by changing the irrigation strategy, partitioning of assimilates over the various organs can be influenced. If the dry-down of the substrate overnight is increased, the plant will experience more stress and as a result will increase the ratio of assimilates allocated to its reproductive organs, the fruits. Over time the fruits will become a larger relative portion compared to other parts of the plant and will receive a larger portion of the assimilates. Changing the irrigation strategy will create a positive reinforcement loop where fruits will be prioritised over other plant organs. However, if the fruits (or other harvestable parts) receive a too large share of the assimilates, the productive parts of the plant, such as the leaves, may atrophy and wither, and may be unable to support the current or future fruits.

As used herein, the term greenhouse may refer to any indoor farming facility that is at least partially sheltered from outside conditions and that has at least one controllable environment parameter, e.g., a climate and/or irrigation parameter.

As used herein, the greenhouse environment relates to all environmental factors affecting the growth or development of the plants in the greenhouse, other than direct mechanical interactions (such as planting or cutting). Thus, the greenhouse environment includes climate and irrigation, but also other factors such as the presence of pollinators such as bumblebees and/or (biological) pest control such as ladybugs or parasitic wasps, release of chemical pest control such as pesticides or other pharmaceutically active compounds, and even sounds.

As used herein, climate refers to the climate inside the greenhouse. Climate may refer to any aspect of the air inside the greenhouse that affects the growth or development of the plants, e.g., temperature, humidity, $CO_2$ levels, radiation intensity (in particular of wavelengths relevant for photosynthesis, also known as photosynthetically active radiation, PAR), ventilation, et cetera. Irrigation may comprise the quantity, frequency, timing, composition, and manner of provision of providing an irrigation fluid to the plants. The irrigation fluid typically comprises water, and may further comprise one or more nutrients and/or other useful compounds.

The optimal climate and optimal irrigation for plants are interdependent and depend on the plants status. For example, too much irrigation may lead to roots of the plants to rot, whereas too little may lead to dehydration and death of the plant. What constitutes too much or too little depends on the plant status and the climate; e.g., if the temperature is high and the humidity low, evaporation may be high leading to a high water requirement. This balance is particularly relevant for greenhouse-grown plants, which are typically far more sensitive to climate and irrigation than outside grown plants. The same is true for other environmental factors, such as pests and pest control. For example, certain climate values may be conducive to both plant growth and pest growth, and thus, the increased growth may need to be weighed against an increased risk of pests and/or the costs of pest control.

In an embodiment, the method further comprises the controller of the greenhouse environment installation receiving the control signals and, in response thereto, effectuating the determined environmental actions. Effectuating the determined environmental actions may comprise causing one or actuators of the greenhouse environment installation to activate, based on the determined environmental actions. This way, the greenhouse environment is effectively optimized. Operating the greenhouse environment installation may comprise (directly or indirectly) controlling actuators of the greenhouse environment installation. This may include, for example, opening or closing windows, turning up or down the heating, releasing irrigation fluid, adding nutrients to the irrigation fluid, releasing pesticides, et cetera.

In an embodiment, the determination of the environmental targets comprises optimizing a long-term optimization loop by extremising a first objective function based on first objectives, and the determination of the environmental actions comprises optimizing a short-term optimization loop by extremising a second objective function based on second objectives, different from the first objectives. The first objectives may be based on the first prediction for the growth and development of the harvestable part and on the second prediction for the growth and development of the productive part.

Thus, the first part and the second part may be split into separately optimized routines. The first part may be optimized using the long-term optimization loop and the second part may be optimized using the short-term optimization loop.

The long-term optimization loop may be run, e.g., once a day or once a week, taking into account updated predictions and developments (realizations) of the past days or weeks. The short-turn optimization loop may be run several times a day, e.g., every 5 minutes, taking into account updated predictions and developments (realizations) of the past minutes or hours. This way, the environment may be constantly optimized, while reducing the computational overhead of the long-term optimization loop, compared to a system with a single optimization loop taking into account both long-term and short-term effects. Moreover, given the high degree of non-linearity a single integrated optimization loop would be unwieldly complex.

In an embodiment, the determination of the environmental targets and the determination of the environmental actions comprises optimizing a single objective function. The single objective function may optimize based on both the first and second objectives. In some cases, a better optimum may be achieved by optimizing for all criteria simultaneously rather than separately.

In an embodiment, determining environmental targets comprises determining a target growth curve and/or a target growth and development curve for the plant, based on the plant status data and the one or more long-term constraints, and determining environmental targets based on the target growth curve and/or the target growth and development curve. The target growth curve and/or the target growth and development curve may be optimized based on, e.g., weather forecast data and market conditions.

As used herein, growth refers to one organism evolving, e.g., a leaf growing or a tomato maturing, while development refers to the evolution of the organization of the plant, e.g., the formation of new leaves, new trusses, or new shoots.

In an embodiment, the method further comprises determining plant actions, e.g. pruning or harvesting, based on the plant status data and/or on the first and/or second growth and development curves and on the one or more long-term constraints, and wherein the environmental targets are based on the plant actions and/or wherein the plant actions are based on the environmental targets.

Examples of plant actions are planting, pruning leaves, pruning stems, pruning fruits, and harvesting. For plants where the fruits are the yield, leaves may be considered a necessary condition. The number and size of the leaves should be sufficient to create enough energy and assimilates through photosynthesis to result in good fruits, but the growing of leaves uses assimilates that are then not any more available for growing fruits. The optimal number and size of leaves is furthermore linked to future outside weather conditions: if there is less (natural) radiation, the temperature may be lowered which results in less energy available for the plant. So, to make sure it stays alive and healthy, the plants energy demand may need to be reduced, through pruning for instance. Fewer organs (leaves, flowers, fruits, . . . ) per are leads to a lower assimilate need per area. This is also referred to as the "source/sink balance".

In a similar vein, pruning fruits may cause the remaining fruits to be larger or to be ripe sooner, but the total number of fruits is, of course, lower. There may be several weeks between pruning and harvesting; for example, for tomatoes, pruning of the flowers (and consequently, fruits) typically occurs about eight weeks before harvesting. Thus, the environment for the entire period between pruning and harvesting may affect the final yield, and thus the determined plant action.

In general, maximizing growth without taking development into account, may have a negative effect on future harvests.

This is especially relevant for so-called indeterminate crops. These are crops that have several harvests per year. For these plants, the environmental actions, and, where applicable, plant actions must not only be optimized until the (first) harvest, but also need to take subsequent harvests into account. This makes optimization substantially more complex than for crops with a single harvest per season. In an embodiment, the plant is an indeterminate crop. The plant can be, for example, a vine crop. These are plants where the fruits grow on a vine, possibly giving multiple harvests per year. Examples of (potentially indeterminate) vine crops are tomatoes, bell peppers, zucchini, eggplants, cucumbers, melons, kiwi, peas, beans, et cetera. The plants may be perennial, but often, new plants are planted at least once a year.

In an embodiment, extremising the objective function comprises estimating a value of the objective function using a machine learning model, the machine learning model being trained on simulations of the response of the one or more plants, or parts thereof, to the greenhouse environment and, optionally, plant actions performed on the one or more plants.

In an embodiment, the determination of the environmental targets comprises determining a spectrally resolved daily light integral to be received by the one or more plants. Growth and development of the one or more plants depends on both the intensity and the spectral distribution of the radiation received by the plants. For instance, the plants may need a minimum (absolute and/or relative) contribution of blue light for the stromata to function. Moreover, varying the amount of radiation, in particular of radiation with relatively short wavelengths such as blue or near ultraviolet light, can affect the synthesis of valuable assimilates, such as, carotenoids, terpenes, vitamin C, et cetera. On the other hand, radiation with relatively long wavelengths such as red, far red, or near infrared light can affect the growth speed and shape of the plants. Additionally, many plants require a contiguous period of darkness, e.g., 6 hours per day, to remain healthy.

In an embodiment, the determination of the environmental actions comprises determining a target spectral distribution for one or more artificial radiation sources providing artificial radiation to the one or more plants. For example, the artificial radiation source may comprise individually controllable color channels, and the system may determine a time-dependent radiation intensity for each color channel. The system may then determine control signals that cause the one or more radiation sources to activate the color channels in concordance with the determined time-dependent radiation intensity per color channel.

In a further aspect, this disclosure relates to a control system for optimizing control of a greenhouse environment installation of a greenhouse. The control system comprises at least one processor configured to determine climate targets and/or irrigation targets for a greenhouse environment in the greenhouse. The determination of the environmental targets comprises the at least one processor receiving plant status data indicative of observable characteristics of one or more plants being grown in the greenhouse. The plants may be fruit-bearing plants. A plant growth and development model may be updated based on the plant status data. The plant growth and development model may be configured to predict a first growth and development curve for a harvestable part of the plant, e.g. fruits, and a second growth and development curve, different from the first growth and development curve, for a productive part of the plant, e.g. leaves. The determination of the environmental targets further comprises the at least one processor receiving one or more long-term constraints indicative of long-term predictions of a first set of external circumstances, and the at least one processor determining environmental targets, based on the plant status data and/or the first and second first growth and development curves, and on the one or more long-term constraints. The determination of the environmental actions comprises the at least one processor receiving one or more short-term constraints indicative of current values and/or short-term predictions of a second set of external circumstance, the at least one processor receiving sensor data indicative of the greenhouse environment, and the at least one processor determining environmental actions based on the environmental targets, the one or more short-term constraints, and the sensor data, the environmental actions comprising rules, e.g., computer instructions, for operating the greenhouse environment installation. The determination of the environmental targets and the determination of the environmental actions comprises extremising at least one objective function. The at least one objective function may comprise both a first metric related to the first growth and development curve and a second metric related to the second growth and development curve. The at least one processor may be configured to send control signals to a controller of the greenhouse environment installation, the control signals configuring the controller to cause the greenhouse environment installation to perform the environmental actions.

In an embodiment, the at least one processor is further configured to operate the greenhouse environment installation based on the determined environmental actions.

In further embodiments, the at least one processor may be configured to perform any of the method steps defined above.

One aspect of this disclosure relates to a computer comprising a computer readable storage medium having computer readable program code embodied therewith, and a processor, for example a microprocessor, coupled to the computer readable storage medium, wherein responsive to executing the computer readable program code, the processor is configured to perform any of the methods described herein.

One aspect of this disclosure relates to a computer program or suite of computer programs comprising at least one software code portion or a computer program product storing at least one software code portion, the software code portion, when run on a computer system, being configured for executing any of the methods described herein.

One aspect of this disclosure relates to a non-transitory computer-readable storage medium storing at least one software code portion, the software code portion, when executed or processed by a computer, is configured to perform any of the methods described herein.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present disclosure may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present embodiments may be written in any combination of one or more programming languages, including a functional or an object oriented programming language such as Java(TM), Scala, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer, server, or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments are described below with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The embodiments will be further illustrated with reference to the attached schematic drawings. It will be understood that the disclosure is not in any way restricted to these specific embodiments. Identical reference signs refer to identical, or at least similar elements.

BRIEF DESCRIPTION OF THE DRAWINGS

FIG. 7A-D depict block diagrams and flow charts for optimizing one or more parts of a model according to an embodiment;

DETAILED DESCRIPTION

The embodiments in this disclosure aim to provide methods and systems for optimizing a greenhouse environment, in particular greenhouse irrigation and/or a greenhouse climate.

Indoor farming typically uses crop cycles which last one year. For many indeterminate crops, these crop cycles start with planting and end with annihilating the plants. In between, the plants may be pruned, thinned, guided, and pollinated, and the fruits may be harvested. Some crops may survive for several years, but they will typically still follow a yearly cycle with regards to, e.g., pruning, pollinating, and harvesting. Yet other plants live considerably shorter than a year, allowing the yearly cycle to comprises several crop cycles of the same of varying crops. In this disclosure, the term "crop cycle" is generally used to refer to this yearly cycle.

Because optimizing the crop cycle, including optimizing the greenhouse environment, is such a hard problem, the yearly cycle is typically repeated in the same, or at least approximately the same manner year after year, so that the farmer can use his experience built up over years or even decades. Sometimes, small alterations may be made based on specific circumstances and experiences of the previous years. However, this experience-based knowledge cannot be easily transplanted to other crops, other greenhouses, or other geographical regions where circumstances are different, e.g., different weather patterns, different labor availability, or different energy costs. This makes it very hard to operate new greenhouses, and in particular greenhouses in 'new' geographical regions.

Figure 1A:
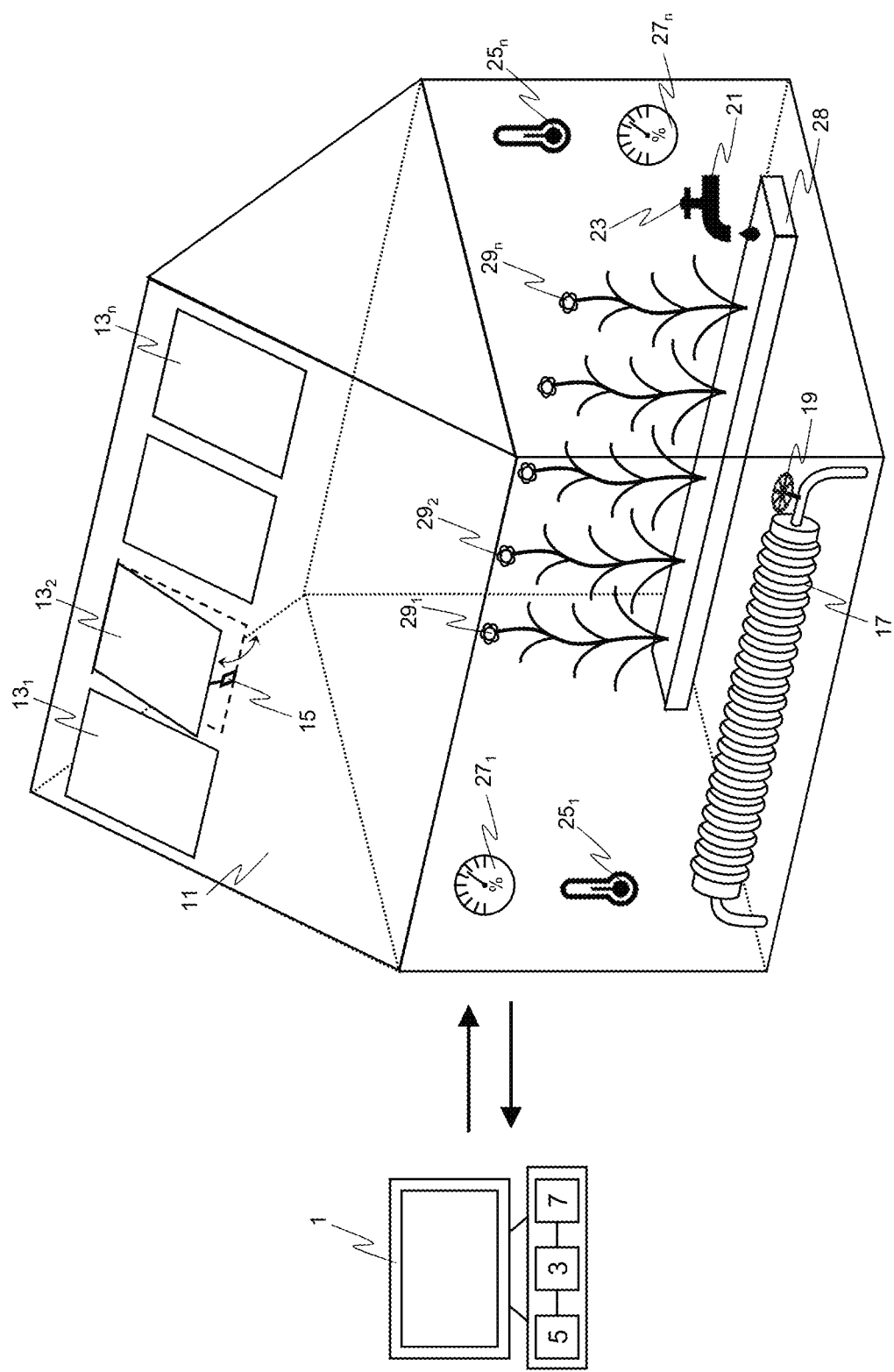
FIG. 1A schematically depicts a system according to an embodiment and FIGS. 1B and 1C schematically depict optimization of the system according to an embodiment.

FIG. 1A schematically depicts a system according to an embodiment. In particular, FIG. 1A depicts a greenhouse 11 communicatively connected to a control system 1.

The greenhouse 11 further comprises one or more actuators operating one or more parts of a greenhouse environment installation. In the depicted example, the greenhouse comprises a plurality of (roof) windows $13_{1-n}$, each of which operated by an actuator 15; a heating system 17, controlled by an actuator 19; and an irrigation system 21, controlled by an actuator 23. In other embodiments, the greenhouse may comprises different and/or additional actuators operating aspects of the greenhouse affecting the greenhouse environment, e.g., screens, lighting, nutrients, $CO_2$ release systems, insect release systems, side windows, loudspeakers, et cetera. The actuators may be controlled (directly or indirectly) by the control system 1. In some greenhouses, some actions affecting the greenhouse environment may be manual actions; for example, the roof windows may be painted with a (typically white) solar reflection paint in the early summer, which may be removed from the windows in the autumn. Similarly, insect release systems may be at least partially manually controlled.

The greenhouse 11 further comprises one or more sensors. In the depicted example, the greenhouse comprises a plurality of thermometers $25_{1-n}$ and a plurality of hygrometers $27_{1-n}$. In other embodiments, the greenhouse may comprises different and/or additional sensors, e.g., light sensors, gas sensors such as $CO_2$ sensors, microphones, et cetera. The actuators are shown schematically but can be electrical (motors, solenoids), pneumatic or hydraulic in nature with suitable switches, control valves and power sources as is known. The actuators or control devices thereof may be communicatively coupled (directly or indirectly) to the control system 1.

The greenhouse 11 may comprise one or more artificial radiation sources (not shown) with individually controllable color channels. The control system 1 may determine a time-dependent radiation intensity for each color channel. The control system may then determine control signals that cause the one or more radiation sources to activate the color channels in concordance with the determined time-dependent radiation intensity per color channel. For example, the control system may be communicatively connected to a light controller, which translates a control signal received from the control system into control values that control the artificial radiation sources, typically using electrical control circuits.

The control system 1 comprises a processor 3 and a memory 5, coupled to the processor. The control system can be a data processing system as described in more detail below with reference to FIG. 11. In the depicted example, the control system further comprises a communication interface 7, coupled to the processor. Using the communication interface, the control system is communicatively coupled to one or more of the actuators and to one or more of the sensors of the greenhouse 11. Based on input from the sensors, the control system can control the greenhouse environment using the actuators and, optionally, instructions for manual operation of parts of the environmental installation of the greenhouse. This, in turn, affects the growth and/or development of plants $29_{1-n}$ in the greenhouse.

The plants $29_{1-n}$ may be fruit-bearing plants, each comprising a harvestable part (here referred to as the fruits, but this may also include, e.g., flowers), and a productive part, typically including the leaves and/or roots. The plants may be indeterminate plants. For example, the plants may be vine crops, such as tomatoes, bell peppers, zucchini, eggplants, cucumbers, melons, kiwi, peas, beans, et cetera.

Figures 1B, 1C:
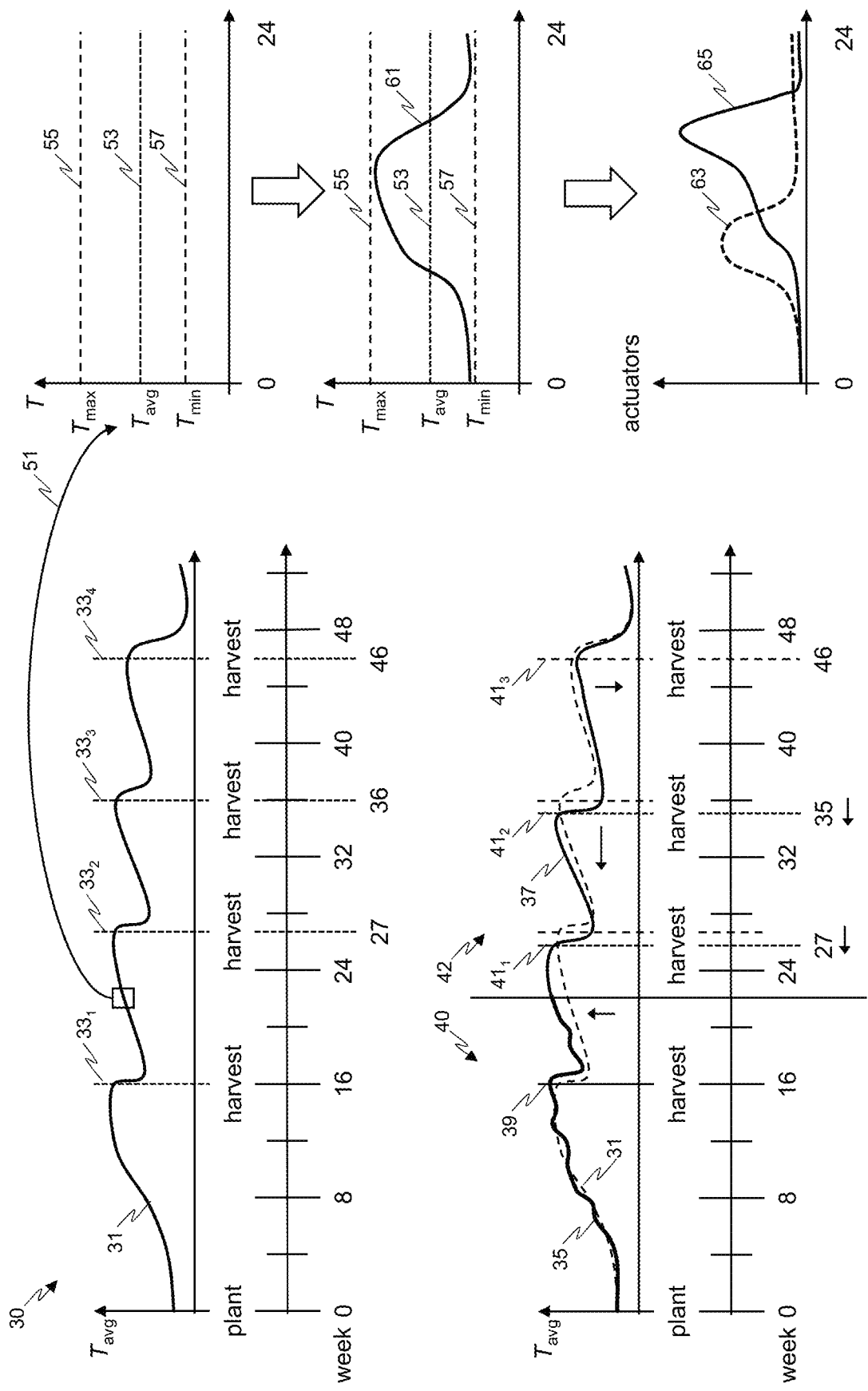

FIGS. 1B and 1C schematically depict examples of optimization of the system according to an embodiment. In particular, FIG. 1B depicts an example of long-term optimization. At the beginning of the crop cycle, an optimal cycle 30 is determined, based on knowledge gathered in earlier years and predictions for the current year. The optimal cycle comprises, inter alia, an optimized average daily temperature 31. The optimal average daily temperature is related to the (optimized) growth and development curves of the crop (not shown), which may take into account both the harvestable and productive parts of the plant. Based on the growth and development curves, a plurality of harvest moments $33_{1-4}$ is planned, in this example in weeks 16, 27, 36, and 46 of the crop cycle. The long-term optimization is described in more detail below with reference to FIG. 3A.

FIG. 1B further depicts the situation in week 22. The plot comprises both the realised situation 40 and an updated (re)optimization 42. The realised average daily temperature 35 is shown with a solid grey line. For comparison, the original optimized average daily temperature 31 is shown using a dashed line. During the first 16 weeks, the realised average daily temperature was generally close to the optimized average daily temperature, and the first harvest was executed at the planned first harvest moment 39.

However, since then, the temperature has been consistently higher than originally planned, and as a result, the plants are growing faster and the fruits maturing sooner than expected. Re-optimization shows that the high growth and development rate may be maintained, so that the next planned harvest moment $41_1$ is a week earlier than originally planned. Although not shown, the higher average daily temperature may require changes to the originally optimized $CO_2$ levels, irrigation plan, et cetera in order to have the shown effect on the growth and development rate.

In this example, the re-optimized average daily temperature curve 37 between the second harvest moment $41_1$ and the third harvest moment $41_2$ is essentially the same as the originally optimized curve 31, only a week earlier. The fourth harvest moment $41_3$ is still planned in week 46 (just in time for Christmas), and as a result, there is an extra week between the third and fourth harvest moments. This leads to a lower re-optimized average daily temperature curve (compared to the originally optimized curve), and hence a saving in (predicted) energy costs. Because, in this example, less energy is used in a generally colder period when energy prices are relatively high, the optimization algorithm found that it was more cost effective to prepone the third harvest moment than to lower the average daily temperature between the second and third harvest moments.

Although only a single re-optimization is shown, in practice, long-term re-optimizations may take place much more frequently, e.g., every day, every few days, every week, or bi-weekly.

FIG. 1C schematically depicts an example of short-term optimization. In this example, the long-term optimization model provides 51, each day, an optimized (target) average temperature $T_{avg}$ 53, a maximum temperature $T_{max}$ 55, and a minimum temperature $T_{min}$ 57. These are used as constraints for the short-term optimization, which results in an optimized daily temperature trajectory 61. The short-term optimization is described in more detail below with reference to FIG. 3B.

Based on the daily (target) temperature trajectory, the actuators of the greenhouse may be controlled. In the depicted example, an exemplary (estimated) trajectory for the heating 63 and for the window opening 65 is shown. The actual actuator control may be updated, e.g., every few minutes based on feedback received from sensors in the greenhouse. The daily target temperature trajectory may be re-optimized several times a day, for instance, every hour or every few minutes.

Figure 2:
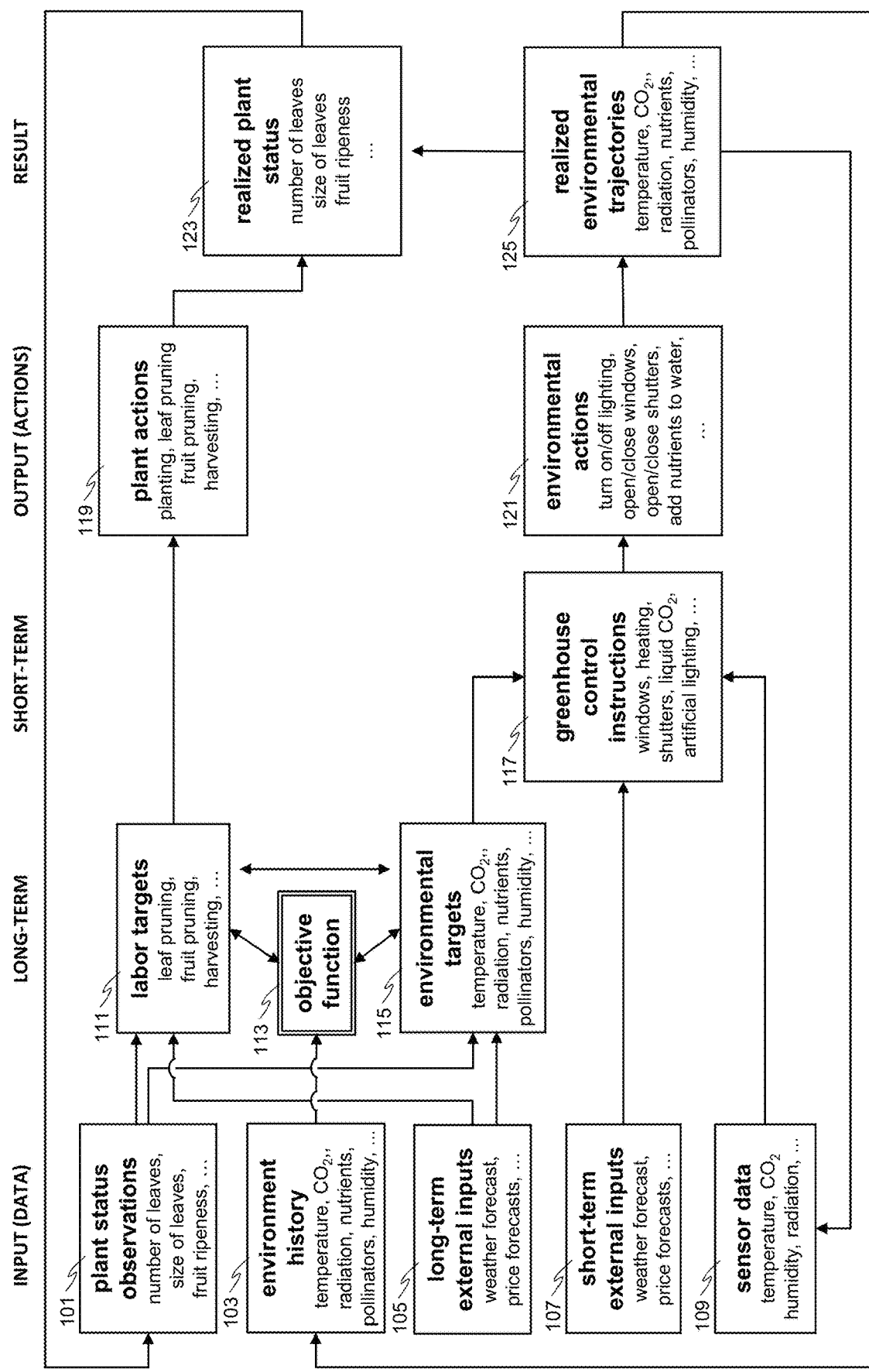
FIG. 2 depicts a flow diagram of a method according to an embodiment.

FIG. 2 depicts a flow diagram of a method according to an embodiment. A first step comprises providing input data. The input data 101-109 can be categorized into one or more data categories, each of which in turn can comprise one or more data elements. The input data may comprise plant status observations 101, e.g., number of leaves per plant, average size of leaves per plant, total leave area per plant, number of fruits per truss, number of trusses per vine, maturity of fruits, presence of pests, et cetera. The input data may further comprise environment data 103 describing the greenhouse environment during the current crop cycle. The environment data may comprise climate data and/or irrigation data. For example, the climate may be described using climate quantities and the irrigation may be described using irrigation quantities. Climate quantities may comprise, e.g., the temperature, humidity, $CO_2$ levels, radiation intensity, et cetera. Irrigation quantities may comprise the amount and timing of water supply, nutrient mix, admixture of other chemicals such as pharmaceuticals or colorants, residue in drain water, et cetera. The environment data may also comprise other data, such as the presence (or quantity) of pollinators (e.g., bumblebees), pests, pest control agents, et cetera. The environment data may be provided as a time series.

The input data may further comprise long-term external input data 105, e.g., long-term weather forecast data including (average) cloud coverage, (average) precipitation, (average) natural radiation; long-term price forecasts for resources such as natural gas, electricity, heat, and labor; and/or long-term price forecasts for produce. Long-term external input data typically describes an expected development for the relevant datum over the entire crop cycle, c.q. the remaining part of the current crop cycle.

The input data may further comprise short-term external input data 107, e.g., short-term weather forecast data including cloud coverage, precipitation, natural radiation; and/or short-term price forecasts for resources such as natural gas, electricity, heat, and labor. Short-term external input data typically describes a current value of the relevant datum or an expected development for the relevant datum on a scale of minutes up to days.

The input data may further include sensor data 109 indicative of the current greenhouse environment, e.g., the current climate and/or irrigation situation in the greenhouse.

Based on the input data, e.g., the plants status observations 101, environment data 103 related to the elapsed part of the current crop cycle 103 and/or long-term external inputs 105, environmental targets 115 are determined using a first objective function 113, e.g., by extremising a cost function. The cost-function may comprise a metric based on a growth and development curve of the plants, typically at least one metric related to a harvestable part of the plant (e.g., fruits) and at least one metric related to a productive part of the plant (e.g., leaves and/or roots). The environmental targets may comprise, e.g., climate targets and/or irrigations targets. Climate targets may comprise (target) values or (target) trajectories (i.e., time-dependent values) of the climate quantities, and irrigation targets may comprise (target) values or (target) trajectories of the irrigation quantities.

Optionally, labor targets 111 may be determined using the same objective function. Labor targets may define direct physical alterations to the plants, e.g., seeding (both the timing and the position, in particular the distance between seeds or plants), thinning plants, pruning leaves, pruning fruits, connecting to a guide wire, harvesting, et cetera. Labor targets may comprise instructions for human laborers, (semi)-autonomous systems, et cetera. The labor targets may be implemented as plant actions 119. In some cases, the labor targets may affect the greenhouse environment, e.g., whitewashing some or all of the greenhouse windows, removing the whitewash, releasing insects in the greenhouse for pollination or pest control purposes, et cetera.

Based on the environmental targets 115 and on the input data, e.g., the short-term external input data 105 and the sensor data 109, greenhouse control instructions 117, e.g., climate computer instructions and/or irrigation computer instructions, may be determined comprising rules for operating a greenhouse environment installation. The determination of the greenhouse control instructions may comprise a second optimization step, using a second objective function. The greenhouse control instructions may comprise detailed rules for operating, e.g., a climate installation and/or irrigation installation. The operation can be direct or indirect, e.g., via a control system such as a climate computer, an irrigation computer, and the like. Thus, the greenhouse control instructions may comprise computer instructions for such control systems. These rules can be based on the current greenhouse environment as described by the sensor data 109. The greenhouse control instructions may be tailored to the capabilities of the greenhouse being operated. For example, the number of windows and how far the windows can be opened may affect the instructions for opening or closing the windows. The implementation of the greenhouse control instructions results in environmental actions 121, e.g., the actual opening or closing of windows, or adding nutrients to the water supply. Thus, these environmental actions result in a realized greenhouse environment 125. Data describing the realized greenhouse environment may be used as input data in a subsequent iteration of the method.

The realized greenhouse environment 125 affects the realized plant status 123. The realized plant status is furthermore affected by the executed plant actions 119. The thus changed plant may give rise to new plant status observations, which may be provided as input data in a subsequent iteration of the method.

Thus, the optimization loop comprises at least two parts, a low-frequency or long-term part 101-105,111-115 and a high-frequency or short-term part 107-109,115-117. In the first part, the targets are determined, based on plant status data 101 and/or (predicted) growth and development curves, (optional) environmental history data 103, and one or more long-term constraints or external inputs 105. The targets comprise environmental targets 115, which indirectly affect plant growth and development, and, optionally labor targets 111, which directly affect plant growth and development. In the second part, environmental rules 117 (or greenhouse control instructions) are determined based on the irrigation targets.

In some embodiments, the first and second parts can be divided into separate optimization loops, whereas in other embodiments, a single optimization loop may be employed. In the former case, the optimization loop can be divided into two or more sub-loops, for example, a long-term optimization loop optimizing climate targets and irrigation targets, a first short-term optimization loop optimizing climate actions based on the climate targets, and a second short-term optimization loop optimizing irrigation actions based on the irrigation targets.

Figure 3A:
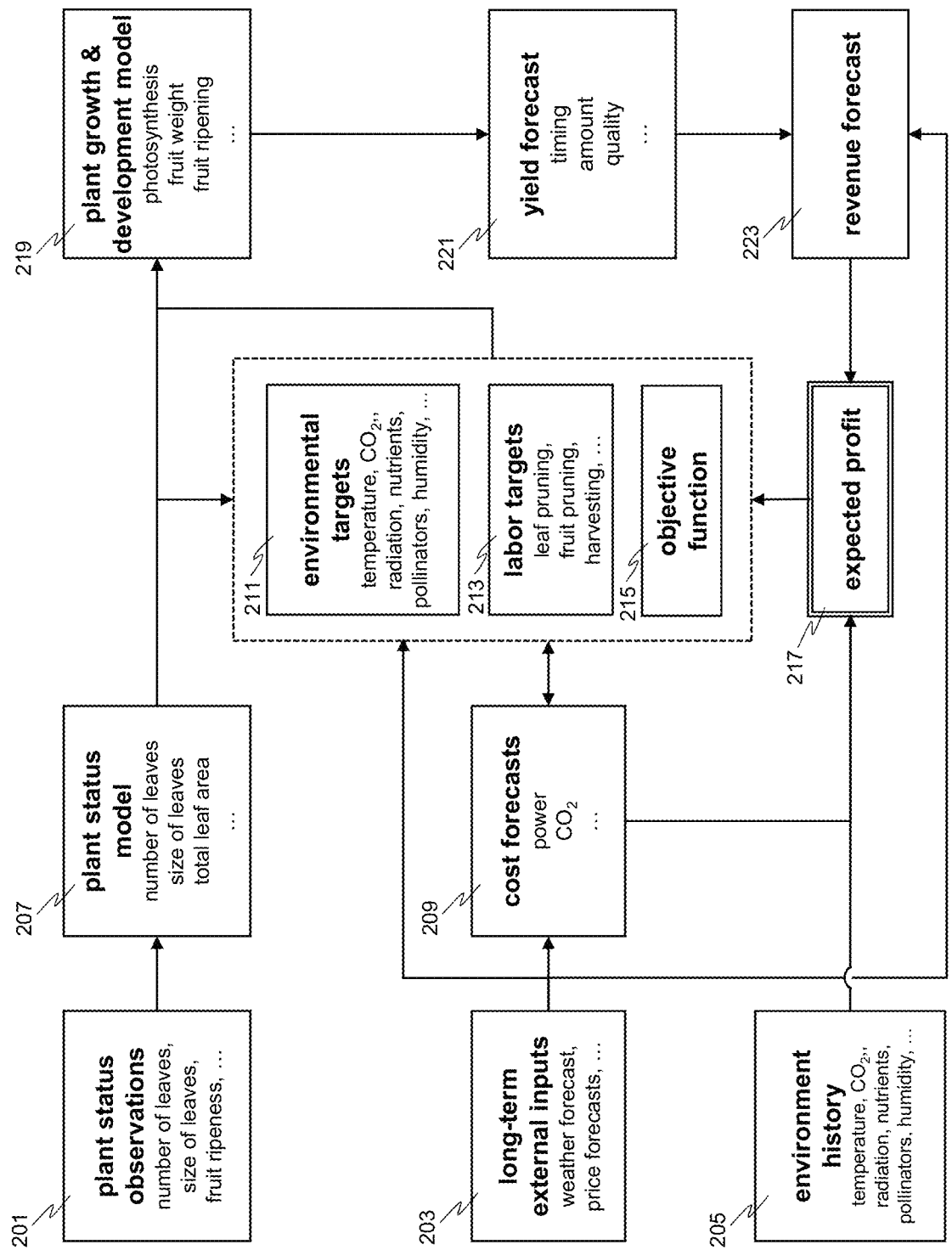
FIG. 3A-3C depict flow diagrams of parts of a method according to an embodiment.
Figure 3B:
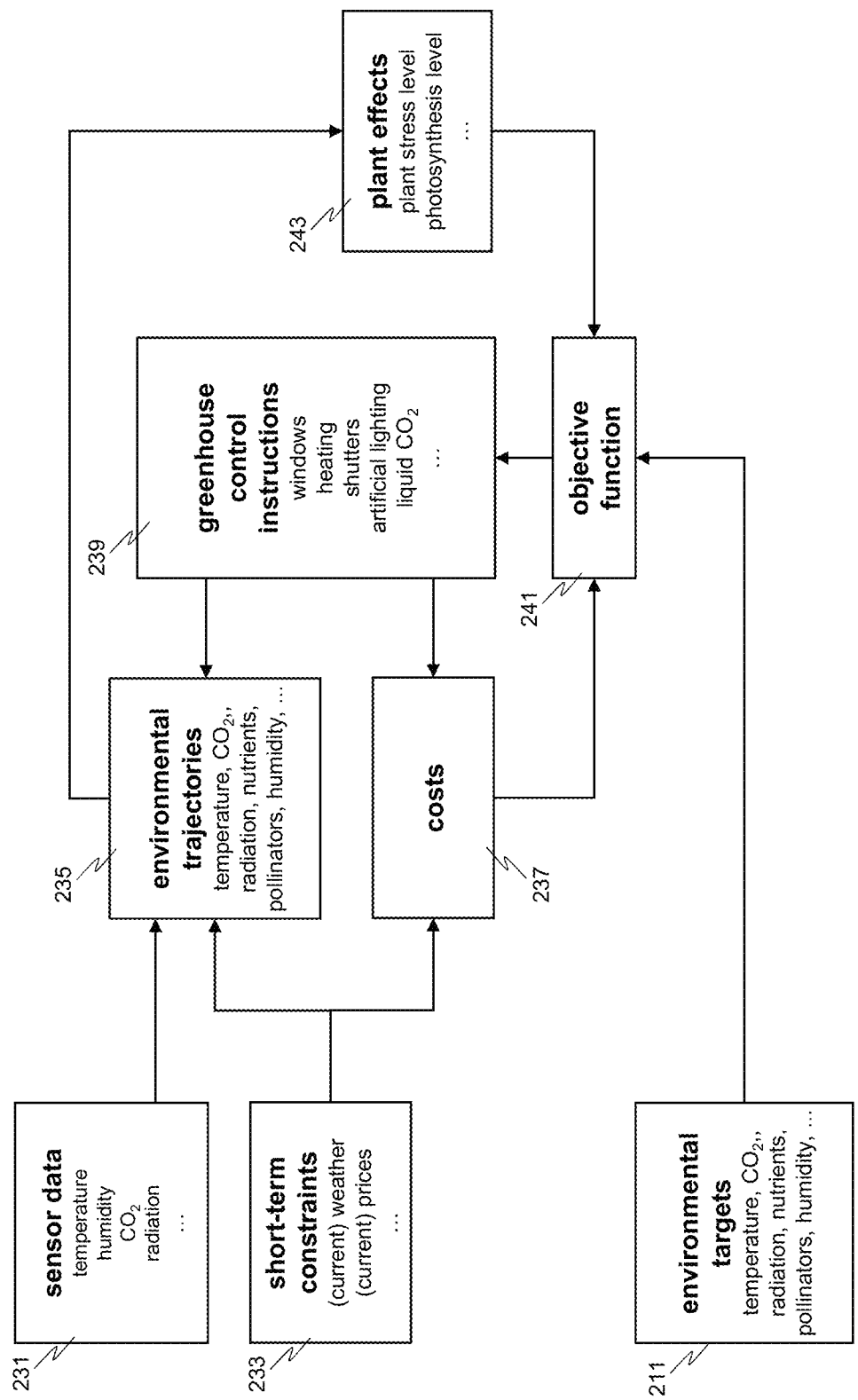
Figure 3C:
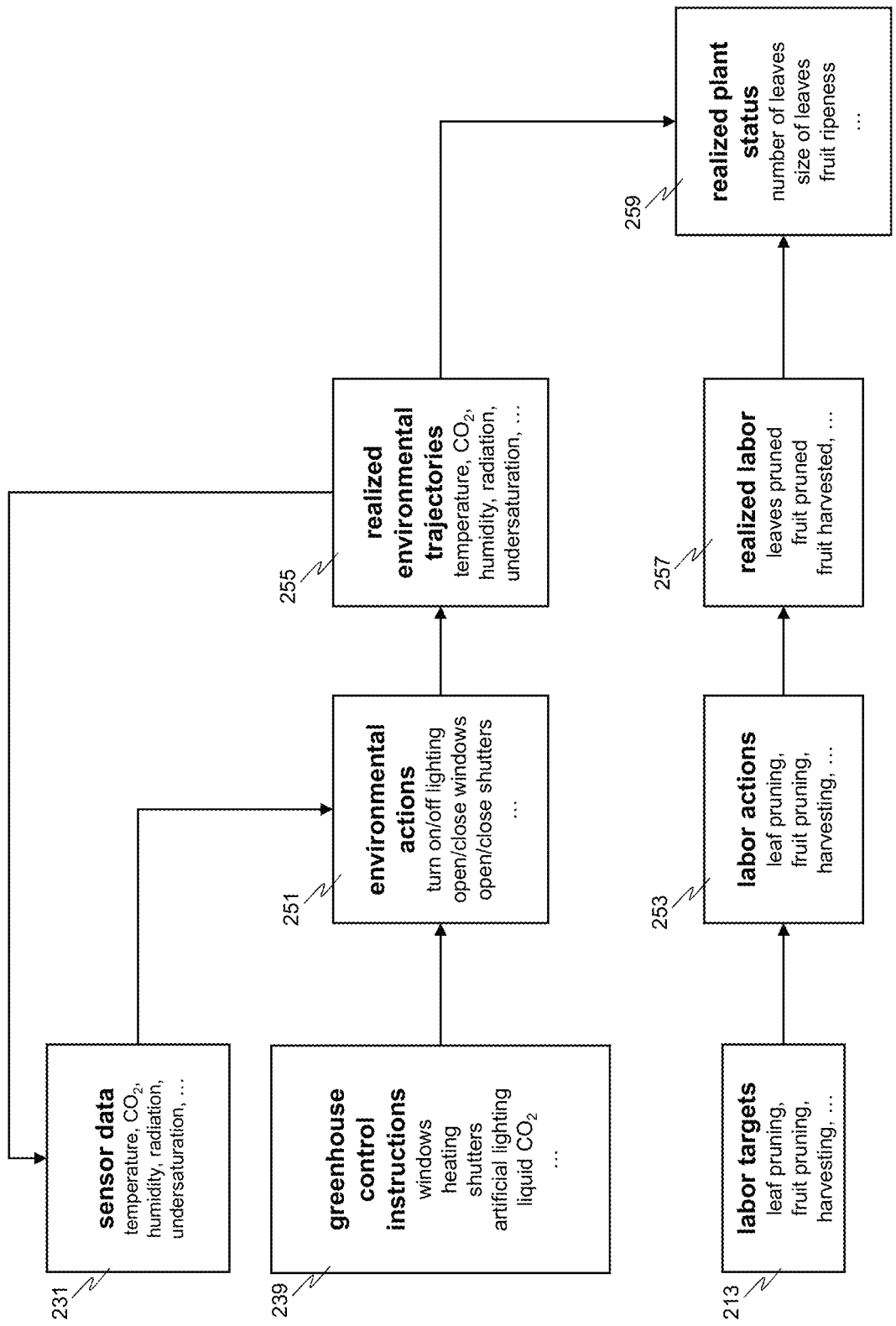

FIG. 3A-3C depict flow diagrams of parts of a method according to an embodiment. In particular, FIG. 3A depicts a flow diagram of a first part of a method for optimizing a greenhouse environment, e.g., greenhouse irrigation and/or a greenhouse climate. In the first part, environmental targets 211 are determined.

In this example, the method comprises receiving plant status observations 201 as described above with reference to FIG. 2. Based on the plant status observations, a plant status model 207 is created or updated. The plant status model may describe the current status of the plant. The plant status model may comprise observed quantities and derived quantities. For example, number of leaves and size of leaves may be provided as observed quantities (e.g., as part of the plant status observations), and total leaf area, photosynthesis potential, and evaporation potential may be derived quantities derived from the observed quantities.

Based on the plant status model 207 and on environmental values, e.g., climate and/or irrigation values, a plant growth and development model 219 may be determined. The plant growth and development model predicts how the plant will react to the environment, e.g., by predicting the amount of photosynthesis, the growth and ripening of fruits, the pollination rate, et cetera. The plant growth and development model may include a part related to the harvestable part(s) of the plant, and a part related to the productive part(s) of the plant. In particular, the plant growth and development model may simulate the production of assimilates by the productive part, the distribution of the assimilates between the productive part and the harvestable part, and the effect on the growth and development of the respective productive and harvestable parts. A more detailed description of the plant status model is provided below with reference to FIG. 6A.

Based on the plant growth and development model 219, a yield forecast 221 may be determined. The yield forecast or yield prediction may include a timing of the yield, an amount, a quality, et cetera. Quality of the fruits may refer to, e.g., size, ripeness, color, et cetera. The quality can be a single value or a distribution. The yield may be determined for the entire crop cycle, and/or for a single harvest.

In the depicted example, the method further comprises receiving long-term external input data 203 as described above with reference to FIG. 2. Long-term external input data may also be referred to as long-term constraints. Based on, e.g., price forecasts, cost forecasts 209 may be based for one or more resources, such as gas, heat, electricity, and $CO_2$. In the depicted example, the price forecasts are received as input data. In other embodiments, price forecasts may be determined based on, e.g., the weather forecast and current prices.

Furthermore, the long-term external input data 203 may comprise a price forecast for the produce. The price forecast may be differentiated with regards to the quality of the produce. Based on the price forecast for the produce and the yield forecast 221, a revenue forecast 223 may be determined. Based on the cost forecasts and the revenue forecast, an expected profit 217 may be determined.

Then, using a provided or predetermined first objective function 215, environmental targets 211 and, in this example, labor targets 213 may be optimized. The objective function can be simple, e.g., maximizing the expected profit 217, or more complex, e.g., allowing a lower profit for a sufficient reduction in $CO_2$ exhaust. In general, the profit is maximised over the entire crop cycle, which may comprise a plurality of harvests.

This optimization is a highly non-linear, complex problem, even more so when labor targets are included. In general, the yield depends on the entire trajectory between seeding and harvesting (possibly multiple times); and, for interim optimizations, on the entire trajectory between optimization and harvest. In the meantime, there is a large influence of external factors such as price developments and weather patterns that can only be predicted with limited accuracy.

FIG. 3B depicts a flow diagram of a second part of the method for optimizing the greenhouse environment. In the second part, greenhouse control instructions 239 (or environmental rules), e.g., climate and/or irrigation computer instructions, are determined, based on, inter alia, the environmental targets 211 determined in the first part of the method.

In this example, the method comprises receiving sensor data 231 indicative of a current environment, e.g., current climate and/or irrigation situation, as described above with reference to FIG. 2. The method furthermore comprises receiving short-term constraints 233 as described above with reference to FIG. 2, for example current weather data and short-term weather forecast data, e.g., a weather forecast for the coming 24 or 48 hours. Using these inputs, environmental trajectories 235 may be determined, typically in dependence of the plant being grown. These trajectories may describe an environmental quantity, e.g., a climate quantity or irrigation quantity, over a period of time, typically a day. For example, some plants require a sufficiently large temperature difference resembling night and day temperatures over each day, whereas other plants do not have such requirements. Based on the environmental trajectories, (simulated) plant effects 243 may be determined, for example, photosynthesis levels, plant stress levels, et cetera.

The short-term constraints 233 may also comprise data indicative of current prices and short-term price forecasts. Based on the prices, expected costs 237 may be associated with resource usage. Based on the plant effects 243 and the predicted costs, the greenhouse control instructions 239 may be determined that result in optimal environmental trajectories, e.g., by extremising a second objective function 241. As will be explained in more detail below with reference to FIG. 8, this is again a highly non-linear problem.

The environmental targets 211, the plant effects 243, and the costs 237 may be provided to a second objective function 241. The goal of the optimization is typically to approach the environmental targets as closely as possible while minimizing the costs and keeping the plant effects within certain constraints. Thus, optimized greenhouse control instructions may be determined. As the greenhouse environment may change over time, for example, due to execution of the greenhouse control instructions or due to changed external circumstances, the second part of the algorithm may be run repeatedly, e.g., every few minutes, or in response to a deviation in the input data.

FIG. 3C depicts a flow diagram of a third part of the method for optimizing the greenhouse environment. In the third part, environmental actions 251 are determined based on, inter alia, the greenhouse control instructions 239 determined in the second part of the method.

In the depicted example, the method comprises receiving sensor data 231 indicative of a current greenhouse environment as described above with reference to FIG. 2. The greenhouse control instructions 239 may be formulated as conditional expressions; for example, if the temperature rises above a certain value, open the windows a certain extent; or if the concentration of nutrients drops below a certain value, add a certain amount of nutrients to the irrigation fluid. Thus, the environmental actions 251 that are taken may depend both on the greenhouse control instructions and on the received sensor data 231. In other embodiments, the sensor data are only used by the optimization part but not by the implementation part, i.e., only by the second part as depicted in FIG. 3B, but not by the third part as depicted in FIG. 3C.

The environmental actions 251 result in a realized environmental trajectory 255, that may be measured by the same sensors that provide the sensor data 231. The realized environmental trajectory may be provided as input data to the first part of the method, for use in a subsequent iteration. The realized environmental trajectory may be provided, for instance, in the form of the sensor data, a subset thereof (e.g., a regular subsampling) or a statistical description thereof, e.g., mean, minimum and maximum.

Similarly, the labor targets 213 as determined in the first part of the method may lead to corresponding labor actions 253, and, thus, to realized labor 257. Generally, the realized labor may be expected to be close or equal to the labor targets, but differences may occur due to, e.g., unforeseen labor shortage, misunderstood tasks, or mistakes in the execution.

The realized environmental trajectories 255 and the realized labor 257 both affect the plants being grown in the greenhouse, and lead to a realized plant status 259. The realized plant status may be provided as plant observations to the first part of the method, for use in a subsequent iteration.

Figure 4A:
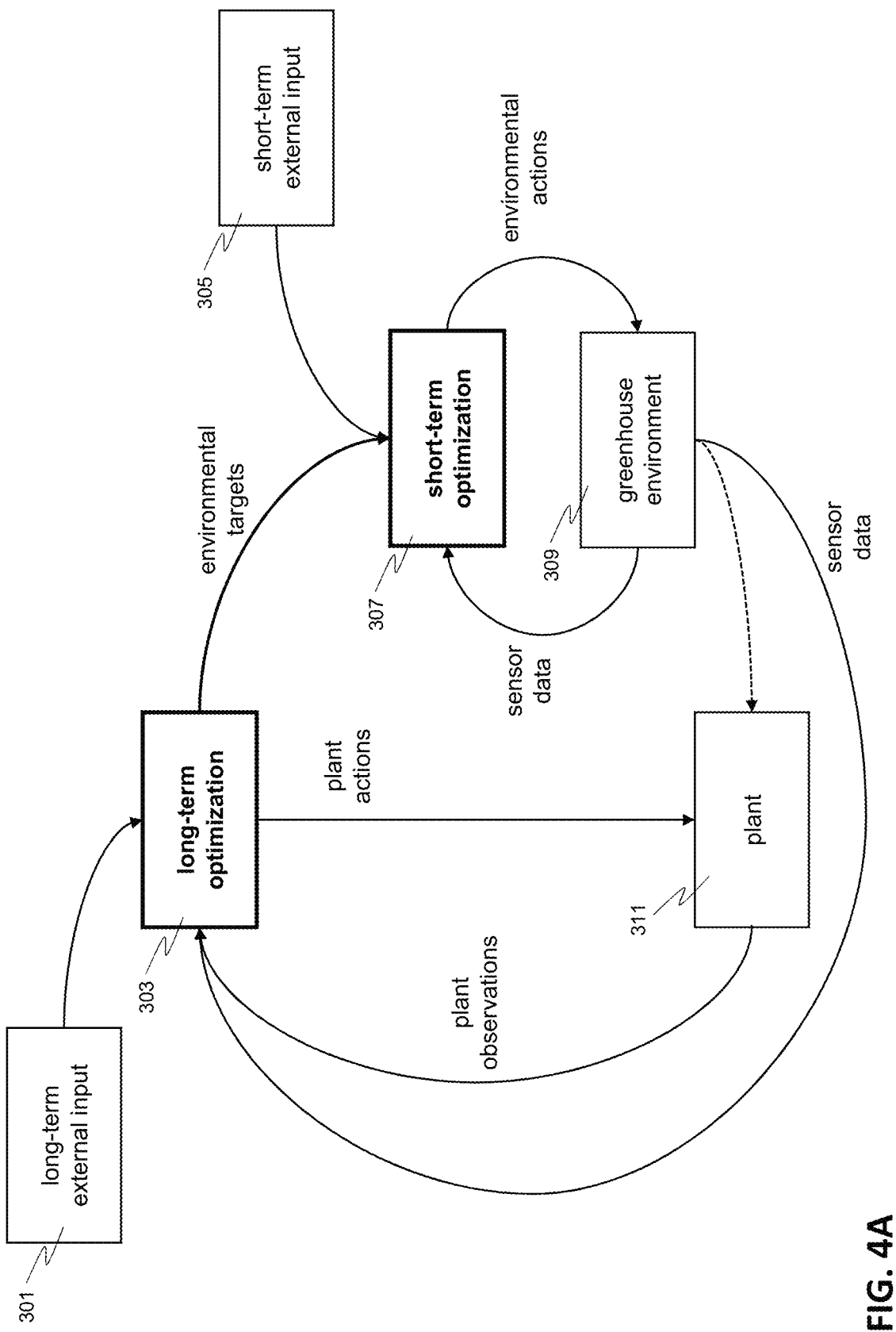
FIG. 4A-4C depict flow diagrams of methods according to an embodiment.
Figure 4B:
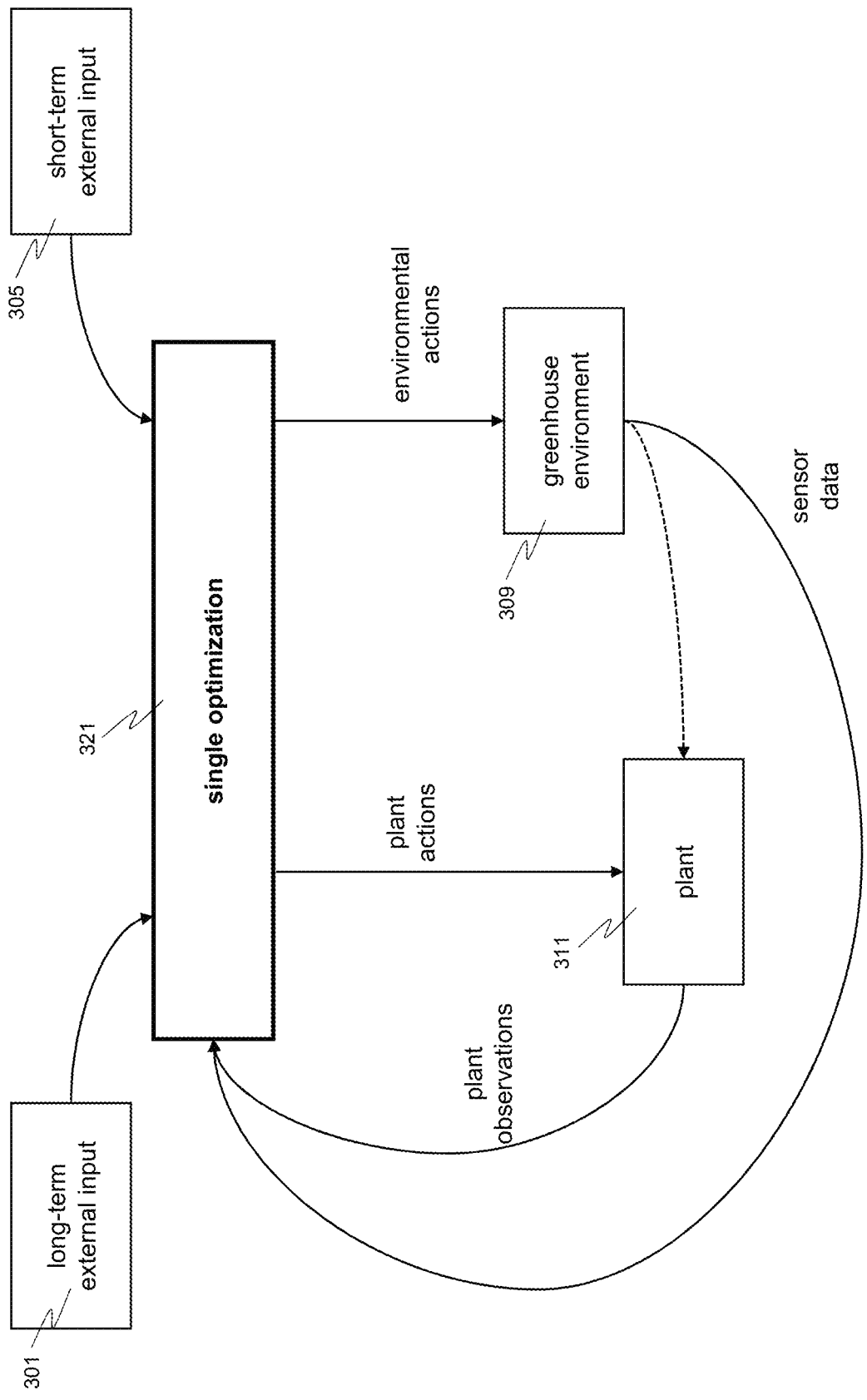
Figure 4C:
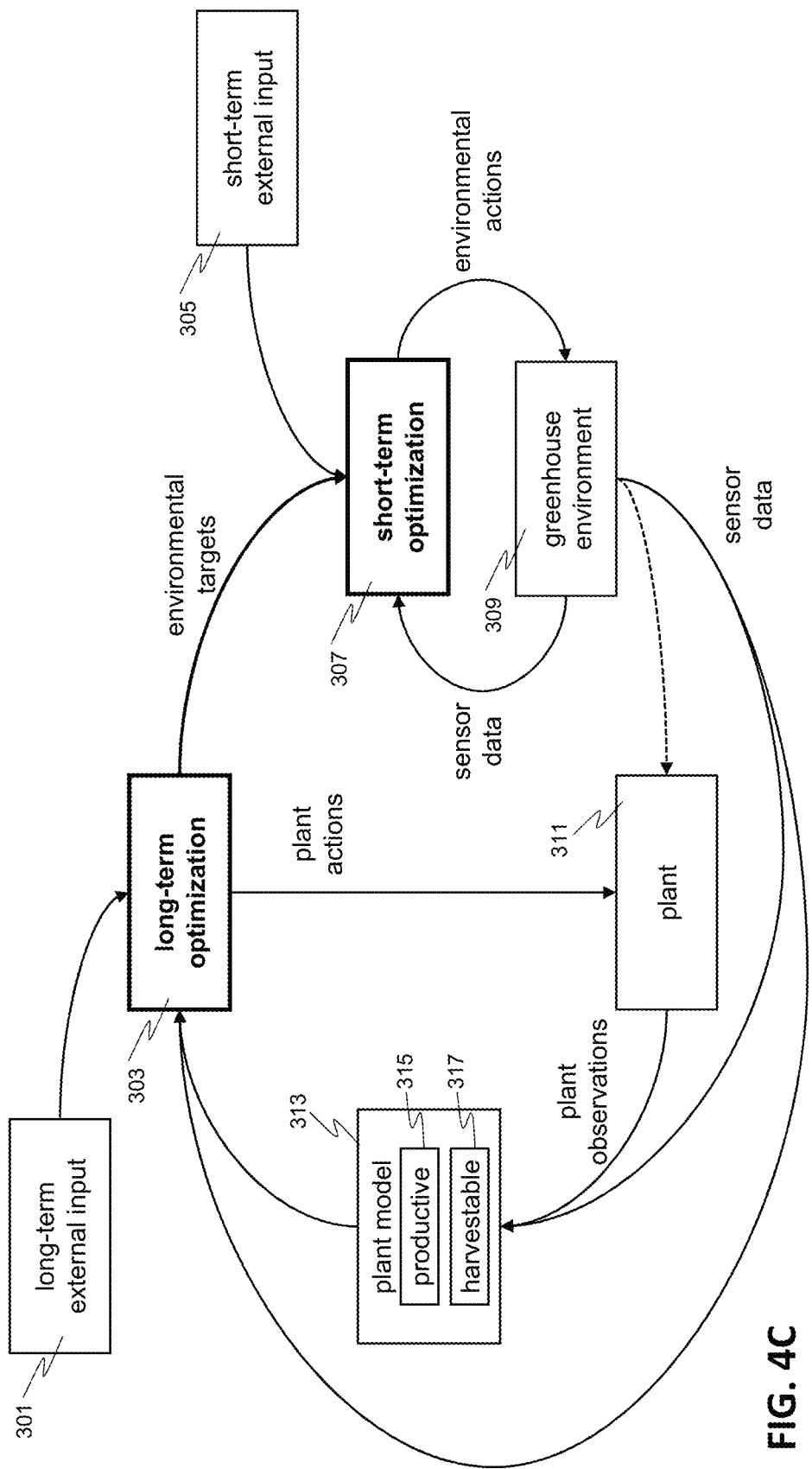

FIG. 4A-4C depict flow diagrams of methods according to an embodiment. In particular, FIG. 4A depicts an implementation with a so-called double optimization loop, whereas FIG. 4B depicts an implementation with a single optimization loop. In the example depicted in FIG. 4A, the long-term optimization part may correspond to the first part of the method as discussed above with reference to FIG. 3A. Based on (long-term) external input data 301, plant observations indicative of a status of the plant 311, and sensor data indicative of a current greenhouse environment 309, plant actions and environmental targets may be determined using a long-term optimization part 303.

The long-term optimization part 303 may be executed with a relatively low frequency, e.g. once per day, or once or twice per week. Hence, the long-term optimization part may also be referred to as a low-frequency optimization part. Additionally or alternatively, re-optimization may occur when the greenhouse environment 309 as described by the sensor data deviates more than a predetermined amount from an expected greenhouse environment, or when some of the long-term external input data 301 changes more than a predetermined amount, e.g., sudden changes in price forecasts due to unexpected global developments.

Subsequently, based on the environmental targets, (short-term) external input data 305, and sensor data indicative of a current greenhouse environment 309, environmental actions may be determined using a long-term optimization part 307. In the example depicted in FIG. 4A, the short-term optimization part may correspond to the second part of the method as discussed above with reference to FIG. 3B.

These environmental actions affect the greenhouse environment 309 in the greenhouse, and hence the measurements by the environment sensors, e.g., climate and/or irrigation sensors. These sensors provide feedback to the short-term optimization module 307, which may lead to re-optimization of the environmental actions. The short-term optimization may be executed with a relatively high frequency, e.g., every minute, every 5 minutes, every 15 minutes, or every hour. Hence, the short-term optimization part may also be referred to as a high-frequency optimization part. Additionally or alternatively, re-optimization may occur when the greenhouse environment as described by the sensor data deviates more than a predetermined amount from an expected greenhouse environment.

The third part of the method as discussed above with reference to FIG. 3C may correspond to the part connecting the output of the first and second parts back to the input of the first part of the method. The actual greenhouse environment 309 affects the plants 311 being grown in the greenhouse. Similarly, the plants may be affected by plant actions determined by the long-term optimization part 303. The new plant status may be provided as input to the long-term optimization part. The actual greenhouse environment may also be provided as input to the long-term optimization part. The different categories of input data may be provided to the long-term optimization part with different frequencies; for example, the sensor data describing the greenhouse climate may be provided daily, whereas the plant observation may be provided only weekly.

In the embodiment depicted in FIG. 4A, the long-term optimization part 303 and the short-term optimization part 307 are optimized independently, each according to its own objective function. This allows relatively fast (re)-optimization of the short-term optimization loop using generally available hardware. This is possible because the effects of environmental actions on the plants 311 typically occur on a much longer timescale than the effects on the greenhouse environment. Although only a single optimization loop 307,309 is shown for the greenhouse environment, in some embodiments, these may be two or more separate or interconnected optimization loops; for example, climate actions and irrigation actions may be optimized separately using different objective functions, but may use both climate sensor data and irrigation sensor data as input.

In the embodiment depicted in FIG. 4B, by contrast, there is only a single optimization loop with a single objective function. This may result in tighter optimization compared to the double optimization loop shown in FIG. 4A. However, the double optimization implementation may require considerably less computational power than a single optimization loop implementation.

Although the single optimization 321 may be run with high frequency, e.g., every 5 minutes or every hour, in general, not all output is updated with the same frequency. Typically, actions with a long-term effect are optimized with a low frequency and actions with a short-term effect are optimised with a high frequency. For example, the environmental actions may be re-optimized with a high frequency, while the plant actions are only optimized with a low frequency. High-frequency updates are typically determined periodically; low-frequency updates may be determined periodically and/or in response to a sufficiently large change in long-term input data and/or on request by a user.

There are several reasons to update long-term actions only with a low frequency. For example, in practice, it is not feasible to provide (human) laborers with new labor actions every few minutes. More importantly, in general, long-term forecasts change only slowly over time. For example, the weather or a price point three months away can only be predicted with low accuracy, and in normal circumstances, such predictions should not change drastically over short periods of time. When exceptional circumstances occur that have a major impact on, e.g., energy prizes, the system may reoptimize the long-term part, e.g. in response to recognizing a large change in long-term input values, or in response to an external input (user request).

By contrast, short-term actions typically should be updated with a high frequency in order to accurately respond to changing weather conditions, such as rain or sunshine starting or stopping.

Although the figure only schematically represents long-term and short-term (external) input, in practice there may be input on more different time-scales. For example, sensor data may be updated every five minutes, current price data may be updated on a daily schedule, and plant status data may be updated weekly or biweekly. Thus, parameters and actions may be re-optimized and updated with the same frequency as with which the parameters upon which they depend are updated.

FIG. 4C essentially shows the same embodiment as FIG. 4A, differing only in the explicit inclusion of the plant model 313. It is noted that the plant model is also implicitly present in the embodiments shown in FIG. 4A and FIG. 4B. In this example, the plant model comprises a first component 315 related to a productive part of the plant, and a second component 317 related to a harvestable part of the plant. The first component is configured to predict a first growth and development curve for a productive part of the plant, e.g., the leaves and/or roots. The second component is configured to predict a second growth and development curve for the harvestable part of the plant, e.g., the fruits. Based on these growth and development curves, metrics may be determined for the objective function that is extremised in the long-term optimization 303 (or analogously in the single optimization 321 shown in FIG. 4B).

Figure 5:
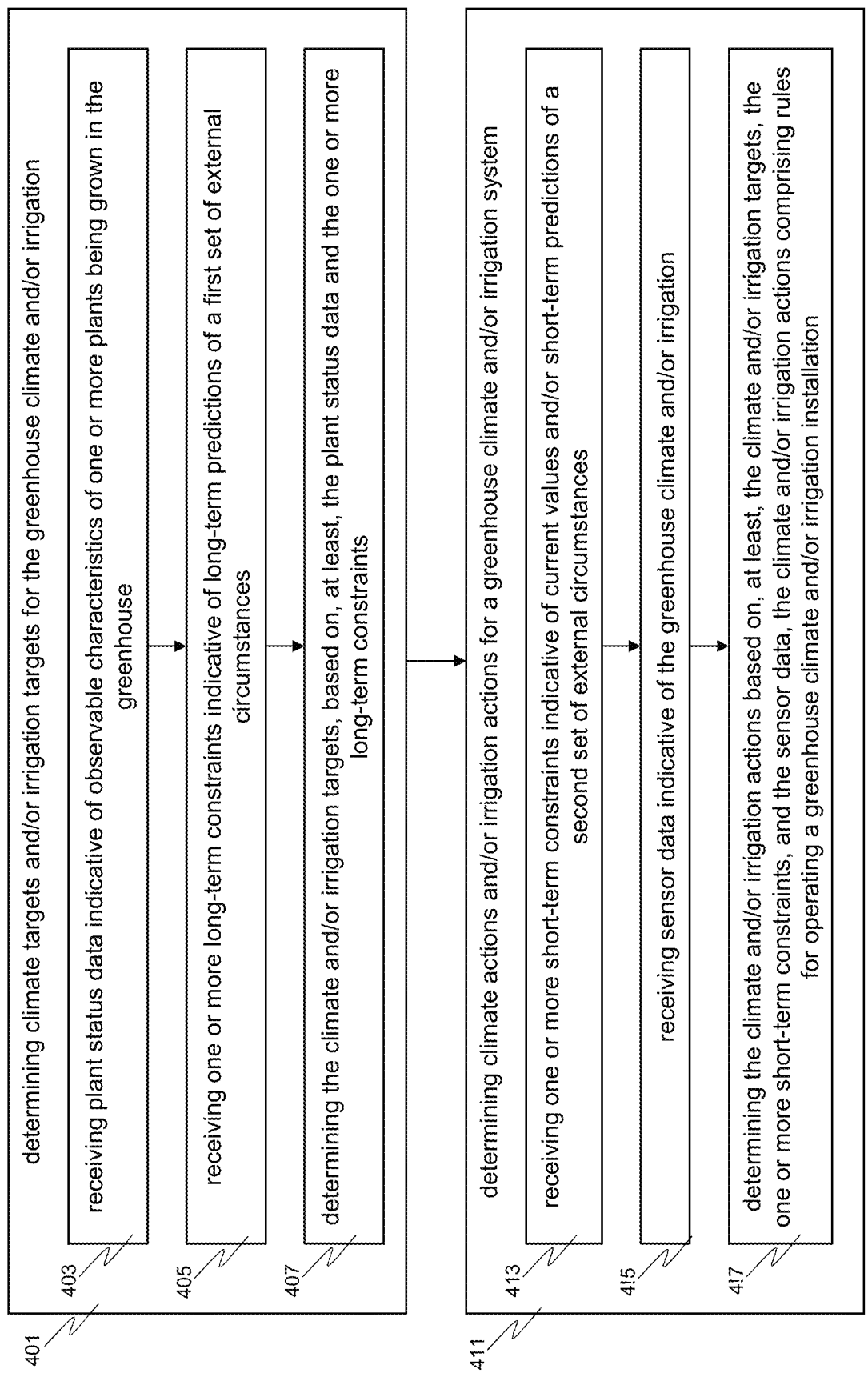
FIG. 5 is a flowchart of a method for optimizing a greenhouse environment according to an embodiment.

FIG. 5 is a flowchart of a method for optimizing a greenhouse environment according to an embodiment. The method may be executed by a data processing system as described below with reference to FIG. 11. A first step 401 comprises determining environmental targets for the greenhouse environment. The determination of the environmental targets comprises steps 403-407. Step 403 comprises receiving plant status data indicative of observable characteristics of one or more plants being grown in the greenhouse. The plant status data may comprise, e.g., a number of leaves per stem, a size of the leaves, a density of stems, a number of fruits, a color of fruits, a chemical composition of a leaf or fruit, et cetera.

The plant status data may be collected automatically and/or manually. For example, a human observer may count and/or measure a first set of observables such as the number of leaves and the size of the leaves, while automated sensors detect and/or measure a second set of observables, e.g., an amount of radiation absorbed by the leaves or volatile organic compounds produced by the plants. In some embodiments, plant status observations may be done completely by humans, dispensing with a need for a large number of sensors. Moreover (experienced) human observers can input relevant data with a high accuracy. In other embodiments, plant status observations may be fully automated, using, e.g., machine vision and/or other sensors. This way, production may be fully or almost fully automated.

Step 405 comprises receiving one or more long-term constraints indicative of long-term predictions of a first set of external circumstances. The long-term constraints may include, e.g., long-term weather forecasts, long-term price forecasts, et cetera. In this context, "long term" may refer to a period between a few days or a week to several months up to a year ahead.

Step 407 comprises determining the environmental targets, based on, at least, the plant status data and the one or more long-term constraints. The environmental targets may be determined explicitly or implicitly.

In some embodiments, determining environmental targets comprises determining one or more target growth and development curves for the plant and/or parts thereof. For example, target growth and development curves may be determined for productive parts such as leaves, roots, stems, et cetera, and/or for harvestable parts, such as fruits and/or flowers. The determination of the one or more target growth and development curves may be based on the plant status data and on the one or more long-term constraints. The one or more target growth and development curves describe a predicted growth and development of the (parts of the) plants being grown in the greenhouse. In such embodiments, determining environmental targets may be based on the determined one or more target growth and development curve.

In some embodiments, the determination of the environmental targets comprises determining plant actions, e.g., pruning or harvesting, based on the plant status data and/or the one or more target growth and development curves, and on the one or more long-term constraints. In such an embodiment, the plant actions and the environmental targets may mutually affect each other. For example, the environmental targets can be based on the plant actions and/or the plant actions can be based on the environmental targets.

In embodiments with both a long-term optimization loop and a short-term optimization loop (or low-frequency optimization loop and high-frequency optimization loop), step 407 may comprise receiving a long-term objective function and the determination of the environmental targets may comprise extremising the long-term objective function. The objective function may comprise one or more metrics related to the one or more target growth and development curves, e.g., a metric related to a harvestable part of the plant and a metric related to a productive part of the plant.

A step 411 comprises determining environmental actions for the greenhouse based on the determined environmental targets. The determination of the environmental actions comprises steps 413-417. The environmental actions may comprise climate actions, irrigation actions, pest control actions, et cetera. For example, environmental actions may include rules to control the windows, the heating, screens, water supply, nutrient supply, et cetera.

Step 413 comprises receiving one or more short-term constraints indicative of current values and/or short-term predictions of a second set of external circumstances. Short-term constraints may comprise, e.g., current or short-term weather forecasts and current or short-term price forecasts. In this context, "short-term" may refer to predictions a few minutes to a few hours up to a few days ahead. Short-term constraints may comprise constraints with a high temporal variability.

Step 415 comprises receiving sensor data indicative of the greenhouse environment. The sensor data may comprise, e.g., temperature, humidity, water level, nutrient concentration, $CO_2$ concentration, radiation, et cetera.

Step 417 comprises determining the environmental actions based on, at least, the environmental targets, the one or more short-term constraints, and the sensor data, the environmental actions comprising rules for operating a greenhouse environment installation.

In embodiments with both a long-term optimization loop and a short-term optimization loop (or low-frequency optimization loop and high-frequency optimization loop), step 417 may comprise receiving a short-term objective function and the determination of the environmental targets may comprise extremising the short-term objective function. In other embodiments, the high-frequency part and the low-frequency may be optimized in a single optimization loop, e.g., by extremising a single objective function.

In some embodiments, the method further comprises controlling the greenhouse environment installation, e.g., the climate installation and/or the irrigation installation, based on the determined environmental actions.

Figure 6A:
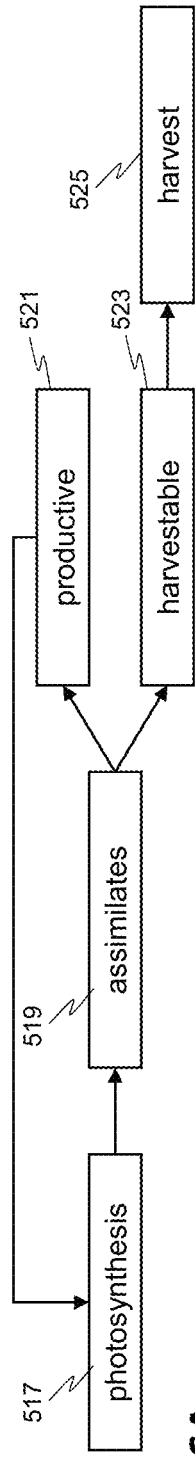
FIG. 6A schematically shows a plant model and FIGS. 6B and 6C depict a block diagram for training one or more parts of a model according to an embodiment.

FIG. 6A schematically shows a plant growth and development model for a fruit-bearing plant. Based on environmental data and plant status data, an amount of photosynthesis 517 is modelled, which is used as input to predict the production of assimilates 519. Which assimilates are being produced in what quantity may depend on the greenhouse environment and the plant status; and hence the model may again use the environmental data and plant status data as input for this step.

The assimilates are then distributed over two, in a sense competing, parts of the plant: the productive parts 521 and the harvestable parts 523. The productive parts typically comprise at least the leaves (characterised by, e.g., leaf area), but may also include also other photosynthetically active parts, e.g., stem, branches, et cetera. The harvestable parts typically comprise the fruits of the plant (characterised by, e.g., number of fruits or total weight of fruits). It is noted that the harvestable parts may, to some extent, contribute to production, but evidently, a harvestable part can only contribute until it is harvested 525.

In general, a balance should be struck in the distribution of the assimilates over the productive and harvestable parts of the plant. If a higher proportion of the assimilates goes to the harvestable parts, this may, on the mid term, increase the (first) harvest. However, this may be detrimental to the productive parts of the plant (which receive correspondingly fewer assimilates), and this may affect the production capacity of the plant on the mid to long term, resulting in reduced future harvests. On the other hand, if too much assimilates go to the productive parts, there are fewer assimilates available for the harvestable parts, leading to a reduced harvest and/or a waste of resources. Ideally, a minimal amount of assimilates is used for the productive parts, while keeping the productive parts sufficient (and sufficiently healthy) for the desired amount of harvestable parts.

It is noted that the balance between productive and harvestable parts may change over time and/or may depend on the greenhouse environment. For example, in the summer the plant may sustain a higher production, and consequently, some time (usually, some weeks) before the increase in production of harvestable parts, an increase in productive parts is required.

Although the current figure only shows a cycle based on photosynthesis, similar cycles may exist for, e.g., nutrient uptake and root development, or other productive processes in the plant.

Figure 6B:
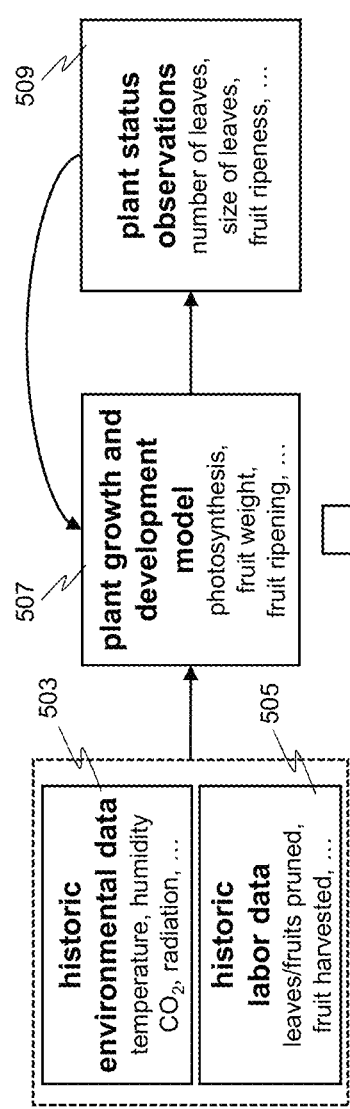
Figure 6C:
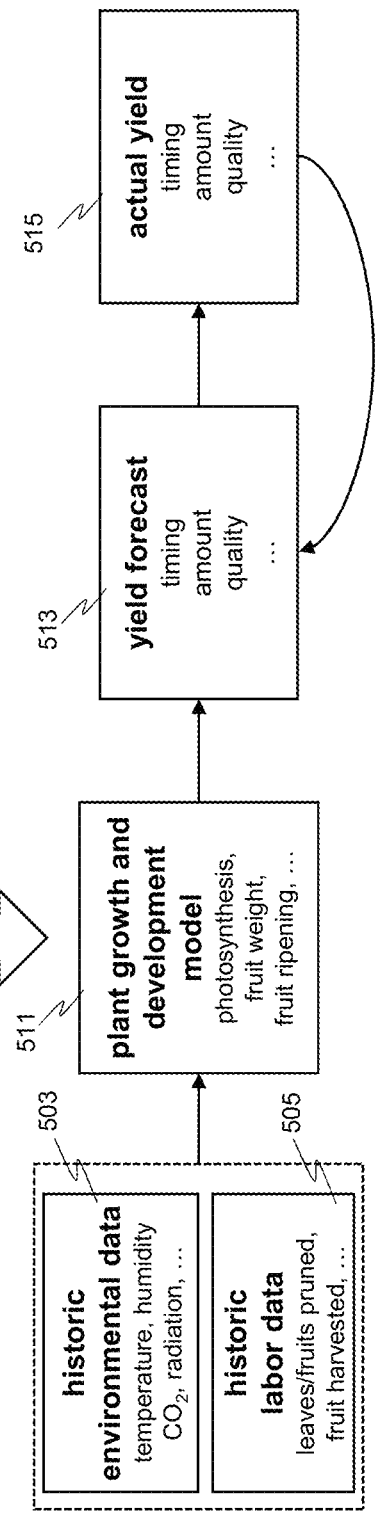

FIGS. 6B and 6C schematically depict a block diagram for training one or more parts of a model according to an embodiment. In particular, FIG. 6B depicts a first training stage. In this example, a plant growth and development model 507 is trained based on historically realised labor (plant actions) 505 and environmental trajectories 503 and the resulting plant status observations 509. Although depicted as a single box, the plant growth and development model may comprise a plurality of modules. For example, the plant growth and development model may comprise a module for predicting the amount of synthesis of assimilates as a function of radiation, nutrient supply, water supply, and leaf area. The plant growth and development model may also have a module for modelling the effect of the plant density (i.e., the number of plants per length unit or per area unit) on the synthesis of assimilates.

Some of these modules may be fully explicit, e.g. if they can be modelled with sufficient accuracy using explicit equations based on physical, chemical, or biological principles. Other modules are at least partly based on machine learning models, e.g., neural networks. Yet other modules may be mixed; for example, the general shape of an equation may be determined based on physical considerations, while the coefficients are optimized using a machine learning model. For example, coefficients of (explicit) formulae may be optimized through differentiation of equations in native code, e.g., using autograd.

Thus, the plant growth and development model may be a recursive model with a high degree of non-linearity. The plant growth and development model may be modelled, for instance, as a complex Markov chain.

Once the plant growth and development model has been trained, in a second stage, other models dependent on the (trained) plant growth and development model 511 may be trained, as shown in FIG. 6C. In the depicted example, the yield forecast is trained based on historic environmental data 503 (e.g., actually realised climate and irrigation trajectories from previous years) and historic labor data 505 (e.g., realised plant actions from previous years), the trained plant growth and development model, and historical yield data 515 in order to get a yield forecast over the entire modelling horizon, e.g., from 1 to 52 weeks from planting. The yield forecast model may again comprise a mixture of explicit and implicit relationships.

In general, training may be limited due to a paucity of training data. This is particularly true for low-frequency events, such as harvests and the resulting yield. Therefore, known data combination methods may be used, where training data may be weighted based on a similarity to the currently be trained model. Historical data from the same crop in the same greenhouse will be most accurate, but his may be supplemented with data from the same crop in greenhouses in similar climate zones, different cultivars of the same plant species in greenhouses in similar climate zones, same cultivars in different climate zones, or even other species. Furthermore, known methods may be used to handle incomplete data; for example, for some data sets, only limited information on environmental trajectories may be available, e.g., radiation trajectories may be lacking, or only average daily temperatures may be available rather than complete daily trajectories, et cetera.

Figure 7A:
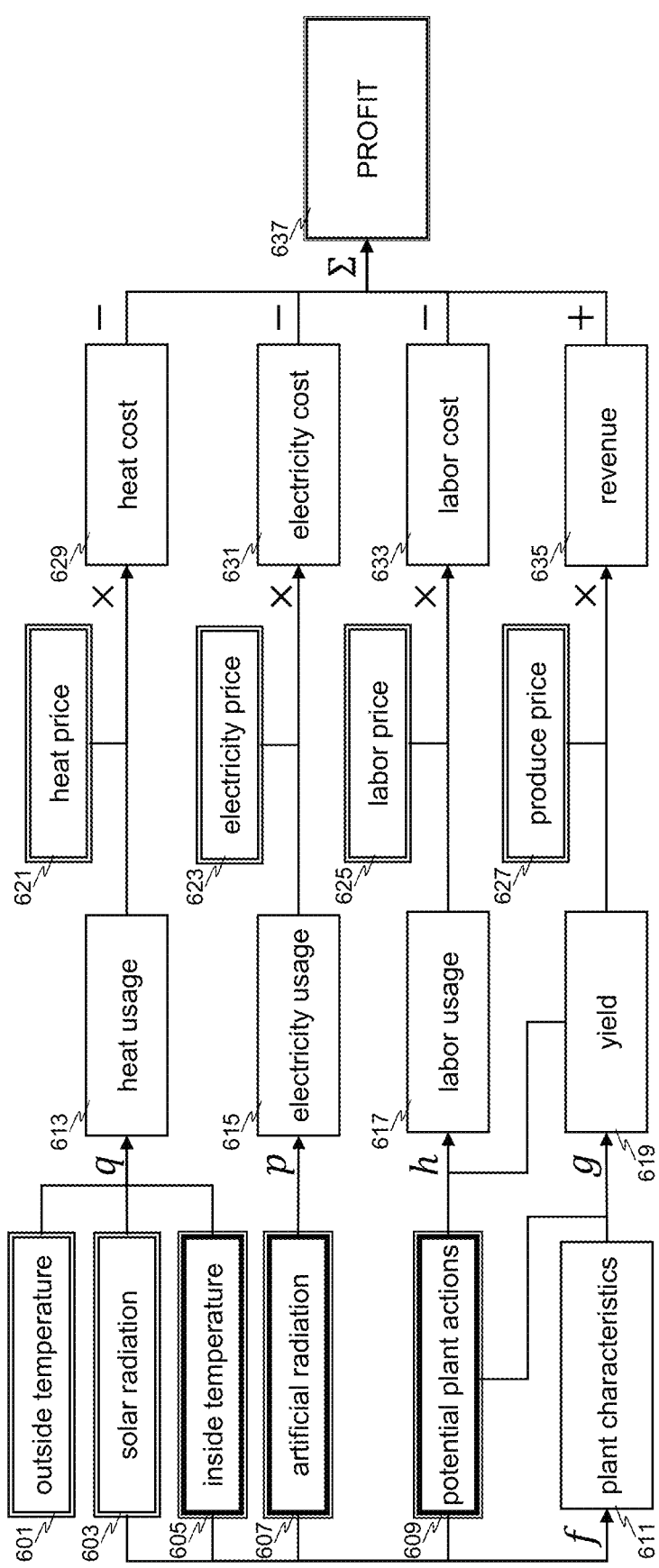
Figure 7B:
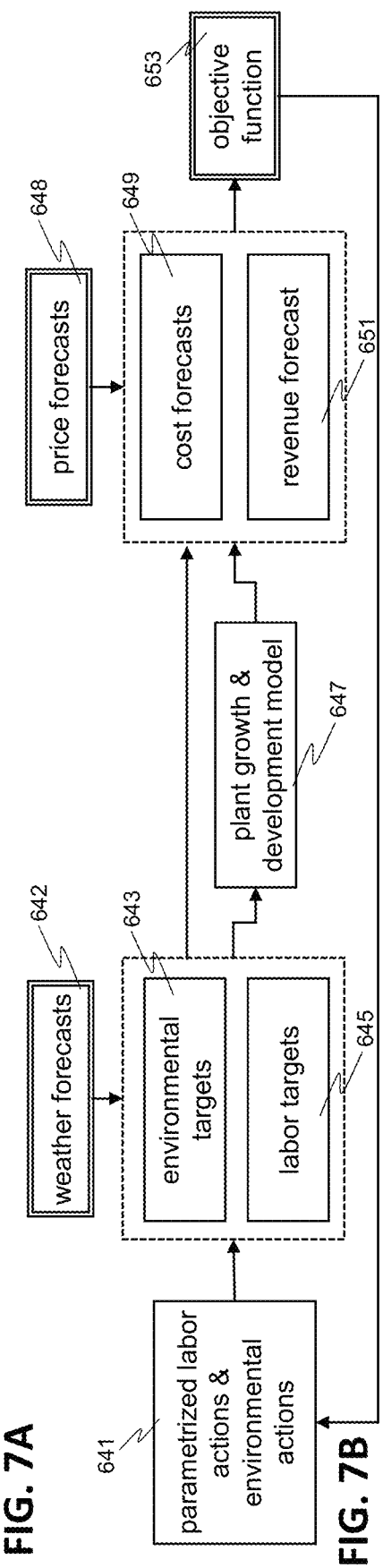

FIGS. 7A and 7B depict block diagrams for optimizing one or more parts of a model according to an embodiment. Once the model has been trained (respectively, all sub-models have been trained), e.g., as described above with reference to FIGS. 6B and 6C, the model may be optimized. However, optimizing the model, especially the long-term part, is a very high-dimensional, non-linear problem. In particular, running the plant growth and development model and predicting the revenue and costs, may be a resource-intensive task with a long computation time.

An illustration of the long-term optimization problem to solve is illustrated in FIG. 7A. This is an example with relatively few components; other embodiments may comprise (many) more components; yet other embodiments may use even less components. In the depicted example, the model is optimized using the following cost function:

$$\max_I (\text{revenue}(W) - \text{labor\_cost}(W) - \text{electricity\_cost}(W) - \text{heat\_cost}(W))$$

wherein $$\text{revenue}(W) = \sum_{w=1}^{W} \text{yield}(w) \times \text{produce\_price}(w)$$

$$\text{labor\_cost}(w) = \sum_{w=1}^{W} \text{labor\_usage}(w) \times \text{labor\_price}(w)$$

$$\text{electricity\_cost}(w) = \sum_{w=1}^{W} \text{electricity\_usage}(w) \times \text{electricity\_price}(w)$$

$$\text{heat\_cost}(w) = \sum_{w=1}^{W} \text{heat\_usage}(w) \times \text{heat\_price}(w)$$

$$\text{yield}(w) = g(\text{plant\_characteristics}(w), \text{plant\_actions}(w))$$

$$PAR(w) = r(\text{solar\_radiation}(w), \text{artificial\_radiation}(w))$$

$$\text{labor\_usage}(w) = h(\text{plant\_characteristics}(w), \text{plant\_actions}(w))$$

$$\text{electricity\_usage}(w) = p(\text{artificial\_radiation}(w))$$

$$\text{heat\_usage}(w) = q(T_{inside}(w), T_{outside}(w), \text{solar\_radiation}(w))$$

and wherein the optimization takes place over a multi-dimensional space I comprising inside temperature 605, artificial radiation 607, and potential plant actions 609:

$$I = \{T_{inside}(w), \text{artificial\_radiation}(w), \text{plant\_actions}(w)\}.$$

Herein, w denotes a temporal unit, e.g., a week, and W denotes the number of such units in the crop cycle, e.g., W=52 weeks. Other embodiments may work at a different temporal resolution, e.g., days, half-weeks, or fortnights. Due to the typically high uncertainty in long-term predictions, a higher temporal may not result in a better optimized result. The above equations assume a first optimization prior to the start of the crop cycle; later re-optimizations may sum over the remaining weeks in the crop cycle, e.g., in week 16, the sums may run over w=16, . . . , W.

In the above equations, PAR refers to photosynthetic active radiation. In general, both natural (solar) radiation 603 and artificial radiation 607 may comprise both a PAR component and other components, e.g., infrared radiation.

In the depicted example, outside temperature 601, solar radiation 603, heat price 621, electricity price 623, labor price 625, and produce price 627 are considered external inputs. These may be provided at the required resolution (e.g., average values per week), or may be converted to the required resolution through, e.g., interpolation, averaging, or the like. As was mentioned above, the inside temperature 605, the artificial radiation 607, and the potential plant actions 609 are tuneable quantities which are optimized. In this example, the goal of the optimization is maximization of the profit 637; other embodiments may have different goals, e.g., maximizing yield at no financial loss, or even more complicated goals taking into account different quantities with different weights, e.g., using a cost function that balances maximum yield, maximum profit, and minimal environmental impact.

The plant characteristics 611, heat usage 613, heat cost 629, electricity usage 615, electricity cost 631, labor usage 617, labor cost 633, yield 619, and revenue 635 are intermediate quantities that describe the relation between the external inputs, tuneable parameters, and optimized quantity. In general, the relation between these intermediate quantities and their inputs can be very complicated. For instance, in the depicted example, the functions f, g, and h in particular are, in general, highly-non-linear functions. In the depicted example, functions p, q, and r can be fairly straightforward, approximately linear functions. However, as is explained below with reference to FIG. 8, in more complete embodiments, also these functions can become complex functions of the input parameters.

The plant characteristics 611 may comprise a quantization of a productive part of the plant and a quantization of a harvestable part of the plant, e.g., the number of fruits per stem and the number of leaves per stem.

Should all functions be linear or almost-linear, then this optimization problem could be solved with a well-known linear programming solver leveraging e.g. simplex and brand-and-bound algorithms, such as CPLEX or Gurobi. However, in general, this is not the case, and specifically designed methodologies may be used. Examples of such a methodology are shown in FIG. 7B-D.

First, the dimensions of the search space may be reduced, for example by using parametrised labor actions (e.g. the potential plant actions) and parametrised environmental actions (e.g. the inside temperature and the artificial radiation) 641 as input. These parameters can be chosen based on domain knowledge to provide suitable parameterizing functions. Historical data may be used to determine an optimal fit. For example, the $CO_2$ concentration target at night typically has a first (constant) value in summer and a second, different value in winter. The change from the summer value to the winter value (and/or vice versa) typically happens in an abrupt manner, within a single week or even a single day. This can be summarized with 3 of 4 parameters: $CO_2$ concentration target in summer, $CO_2$ concentration target in winter, week number(s) at which the change-over between summer and winter value occurs. This way, there is no need to optimize the $CO_2$ concentration for each week separately. In a later stage, week-to-week or day-to-day variations can be applied, e.g., during re-optimization of the long-term optimization loop or based on results of the short-term optimization loop.

In a next step, these parametrised actions translate into environmental targets 643 and labor targets 645. Based on these initial guesses, intermediate quantities may be determined such as plant growth and development curves 647, costs forecasts 649, and a revenue forecast 651. This way, a function may be created that maps parametrized actions (with a relatively low dimensionality) to an outcome 653.

An optional next step comprises training a machine learning model which will learn, given a set of parametrized actions, what the outcome will be. This machine learning model may be referred to as an approximator. The use of an approximator helps reduce the run time of this otherwise long computation. The machine learning model may be a neural network, a random forest, etc.

The training is shown in more detail in FIG. 7C. The features of the machine learning model are points in the optimization space, and the target is the desired metric, for instance profit. Thus, in embodiments using parametrized actions, the features are the parametrized actions, e.g. the parametrized labor actions & environmental actions 641. Consequently, an optional first step 661 comprises receiving or determining the parametrized input space.

The data used for training are generated using the (full) simulation models, sampled in a way to represent the full solution space. Thus, a step 663 of the training method comprises generating training data. This step comprises (coarsely) sampling 665 the (optionally parametrized) input space and determining 667 the associated output using the full simulation model. In general, the denser the sampling of the input space, the more accurate the approximator may be trained, and hence, the more accurate the approximations will be. On the other hand, increasing the size of the training data set increasing both the time needed to generate the training data and the time needed to train the approximator. Thus, the sampling should be sufficiently dense to provide a sufficiently accurate approximation without being so dense as to lead to unwieldy data generation and training times. In general, a few thousand data points may suffice to train the approximator, although this may depend on the complexity of the used models.

Finally, a step 669 comprises training the approximator using the generated training data. The end-to-end simulation model typically takes a few seconds to run, whereas the trained approximator only needs a few milliseconds to provide an approximation of the output. Thus, generation of the input data may take a few hours, and training of the approximator, including hyperparameter tuning, may take an additional few hours. This time investment is easily regained by the speed-up provided by the use of the approximator. In embodiments where the full simulation model is relatively simple and fast to evaluate, and/or wherein the input parameter space is relatively small (for example, for greenhouses with only limited control options), there may be no need to use an approximator; nevertheless, even in such cases, the use of an approximator may still save time and energy during the optimization phase.

The optimization process may then efficiently explore the parameter space, for instance using a random walk, to find potential candidates for high outcomes and eventually an optimal solution. A flowchart of an exemplary optimization method is shown in FIG. 7D. A first step 671 comprises selecting a first point in the input space. As described above, the input space can be a parametrized input space. The first point may be selected heuristically, e.g., based on the optimal set of input parameters of the previous year, or at random. Using the approximator, an approximate output value $v_{app}$ is determined 673 for the selected point. A step 675 comprises comparing the approximate output value with the current optimal value $v_{opt}$. Before the first iteration, the current optimal value may be initialised with, e.g., a minimally acceptable value. If the approximate output value is higher than, or almost as high as the current optimal output value, the current evaluation point is considered a potential candidate for a new optimum.

Whenever a potential candidate is found, (i.e., a new set of parameters that performs better than or almost as good as the previously best set of parameters), an accurate output value $v_{acc}$ is determined 677 by running the actual full simulation, to validate this assumption. If a comparison 679 shows that the potential candidate indeed performs better than the previously best set of parameters, i.e., the accurate value $v_{acc}$ is higher than the stored optimal value $v_{opt}$, the best-so-far solution is updated 681 and $v_{acc}$ is stored as the new optimal value $v_{opt}$.

A step 683 comprises determining whether a maximum number of iterations has been reached. This maximum number may be, for example, a predetermined maximum, a number of iterations after the (last) optimum has been found, or a combination of both. If the maximum number has not been reached, a next point is selected 685 in the input space; else the optimization stops and the last found optimum value is considered the optimum. In some embodiments, after determining the optimum, a search in the neighborhood of the optimum input value may be performed in the full, non-parametrized input space.

Evidently, when the optimization is phrased as a minimisation problem, in the preceding description, "higher/larger" may be replaced by "lower/smaller" and vice versa.

Returning to FIG. 7B, the outcome of the optimization process comprises the optimized environmental targets 643 and labor targets 645. These optimized targets can be used as input in a short-term optimization loop.

Given the complexity of the optimization problem, in general, there is no guarantee that the found optimum is indeed the true global optimum; however, in practice it is sufficient that the found optimum is reasonably close to the global optimum with a sufficiently high probability.

The short-term optimization loop may be designed in a similar way. However, in general, the short-term optimization is more linear than the long-term optimization, and standard optimization methods may work as well.

Figure 8:
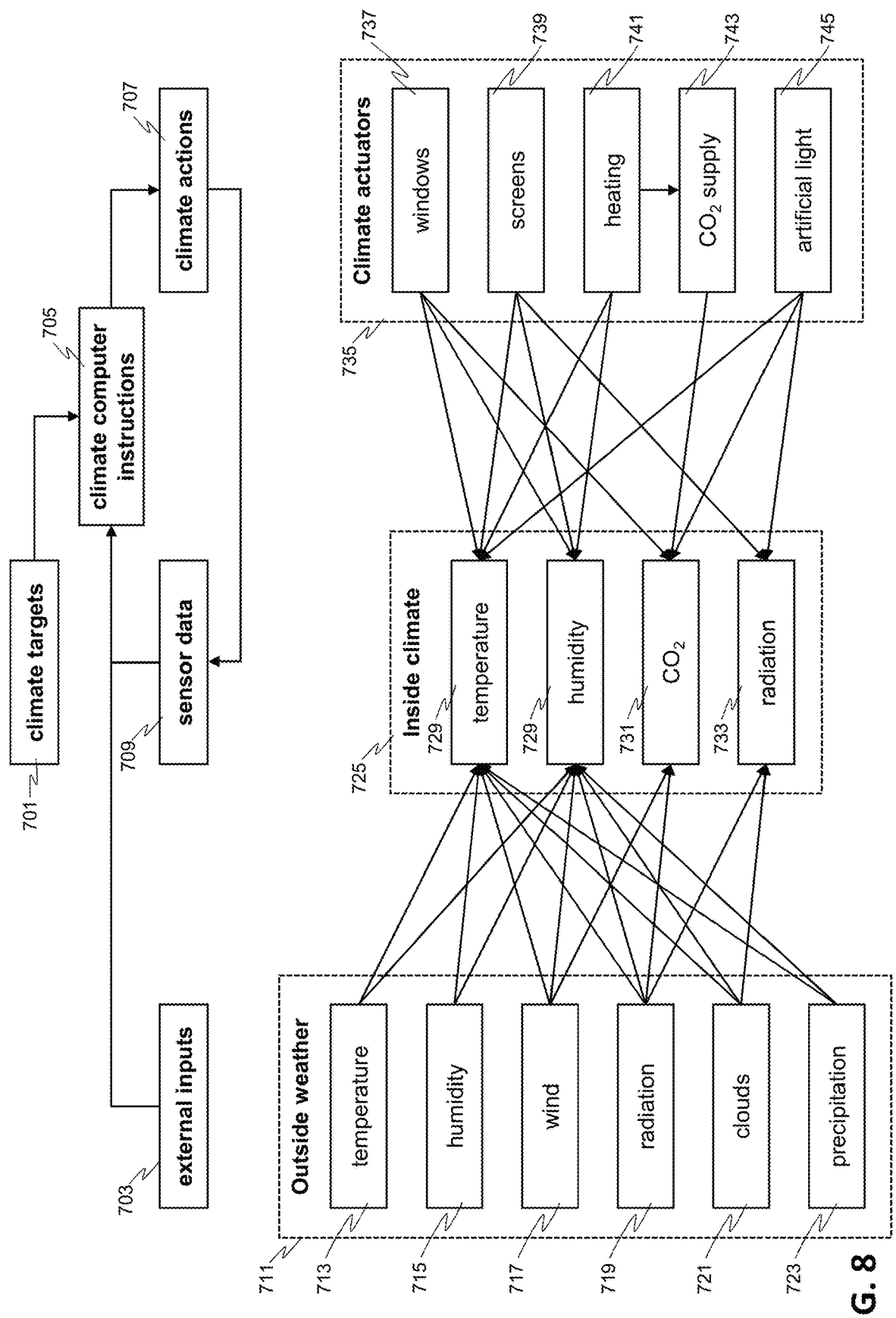
FIG. 8 provides an example of how various elements may interact with each other.

FIG. 8 provides an example of how various elements may interact with each other. For example, the environmental targets may comprise climate targets specifying values or bandwidths for a plurality of climate quantities. In the depicted example, these are temperature, (absolute) humidity, $CO_2$ concentration, and radiation intensity. These climate quantities are also measured by various sensors placed throughout the greenhouse, and the measurements may be provided to an input of the short-term optimization part (which optimizes the climate computer instructions). These climate quantities can be affected by outside influences such as the outside weather. The outside weather quantities may be measured locally and/or may be received from, e.g., a weather service. In this example, only the effects of the (outside) temperature, humidity, wind (speed and direction), radiation intensity, cloud cover, and precipitation (amount and form) are taken into account. Each of these weather quantities may directly or indirectly affect one or more climate quantities; for example, the outside radiation intensity may affect the inside radiation intensity, the inside temperature, the inside humidity (through its effect on evaporation) and the inside $CO_2$ levels (through its effect on photosynthesis and, hence, $CO_2$ absorption). Conversely, each climate quantity may be directly or indirectly affected by one or more weather quantities; for example, the inside temperature may be affected by the outside temperature, the outside radiation intensity, the wind, and the outside humidity (through its effect on the outside air heat capacity).

The inside climate can furthermore be affected through one or more climate actuators. It depends on the greenhouse which actuators are present and what degree of control is available. In this example, windows may be opened or closed to various degrees, screens may be opened or closed to various degrees, heating may be applied (and in some greenhouse, there are multiple heating options available), there is a direct $CO_2$ supply, and there is artificial lighting that can be lit with various intensities. Each of these actuators may directly or indirectly affect one or more climate quantities. For example, opening a window can affect the temperature, the humidity, and the $CO_2$ concentration in the greenhouse. Conversely, each climate quantity may be directly or indirectly affected by one or more climate actuators; for example, the inside temperature can be affected by the position of the windows, the position of the screens, the amount of heating, and the intensity of the lighting.

Furthermore, the outside weather may affect the effect of the climate actuators. For example, the strength and direction of the wind may affect the effect of opening of closing windows.

Consequently, it is an exceedingly difficult problem to optimize the climate actions based on received climate targets. The same holds true for other environmental actions and targets, e.g., optimizing irrigation actions based on received irrigation targets.

FIG. 9 depicts a relative saturation of a substrate optimized according to an embodiment. In particular, the graph depicts the time-dependent behavior of the relative saturation over two (non-consecutive) days. The relative saturation is a measure for the amount of water in the substrate. The relative saturation is an example of sensor data indicative of a greenhouse environment, in this case, an irrigation status.

The control of the irrigation strategy, and in particular the dry-down of the substrate overnight, is an example of the complex interactions between long-term and short-term strategies. Dry-down refers to a relative saturation substantially below 100%, e.g., relative saturation <98%. In the depicted case, a high water supply (relative saturation close to 100%) during daytime maximises the formation of assimilates by the plant (needed for plant growth and fruit formation). At the same time, the plant's roots need oxygen in order to stay healthy. This leads to conflicting targets. Furthermore, if the dry-down is increased (i.e., the relative saturation is decreased), the plant will experience more stress and as a result will increase the ratio of assimilates allocated to its reproductive organs, the fruits. Over time, the fruits will become a larger relative portion compared to other parts of the plant and will receive a larger portion of the assimilates. Changing the irrigation strategy (as shown by the difference between day A and day B during the night) will create a positive reinforcement loop where fruits will be prioritised over other plant organs. This leads to daily targets of dry-down at sunset and at sunrise, produced by the long-term optimization loop.

In the depicted example, the irrigation targets comprise a saturation equal to 92% at sunset on both days, but different values at sunrise (about 88% and 86%, respectively). The undersaturation at sunset ensures that the plants go properly into the night (in order to avoid fungi, oxygenize the slab, et cetera). The (different) undersaturation at sunrise can be used to drive the plant towards vegetative or generative behavior. For example, if the plant is weak (as may be deduced from the plant status observations as described above with reference to FIG. 2), then the plant may be driven to a more vegetative state, i.e., to put more assimilates into its leaves and stems. This may reduce production in the short term, but will ensure the plant stays healthy and productive for the rest of the season, and thus increase the yield over the full season.

During the day (24-hour period), those targets will inform the short-term irrigation control, which comprises choosing the timing of irrigation shots as well as the amount of water per shot. FIG. 9 shows how the same principal target, 92% saturation at sunset, corresponding to the dry-down at sunset, can lead to different irrigation strategies depending on the day. On day A (dashed), the shots of irrigation had to be stopped at 12 pm, while on day B (dotted) the last irrigation happened at 2 pm. Similarly, on day A, a larger number of irrigation shots is released during the night, and the irrigation shots are much larger than the single irrigation shot during the night on day B.

The timing and amount of the last irrigation shot are based on the expected dry-down rate (due to, e.g., evaporation and water absorption by the plants) between the last irrigation shot and sunset. The expected dry-down rate, and thus the irrigation rules, may be based on the dry-down rate earlier during the day, the dry-down rate at similar hours on other days, other environmental variables (e.g., temperature targets or expected radiation) and (expected) environmental actions (e.g. opening or closing of windows), et cetera.

The short-term optimization for the irrigation may result in conditional instructions for an irrigation installation, e.g., "if relative saturation drops below 99%, irrigate until relative saturation reaches 100% or until X litres of water have been provided, whichever comes first". In other embodiments, the control can be more direct, e.g., "release X litres of waters now".

If the target is not reached, i.e., the dry-down at sunset/sunrise is too high or too low, the difference between the actual dry-down and the target dry-down may be taken into account for the next iteration of the long-term optimization loop, because of the long-term effects on the plants described above. For example, if a different dry-down was achieved in the morning, the plants may have been driven more vegetative or more generative (for instance). This change may impact the long term expectations of yield and plant status (e.g., plant health). This, in turn, impacts the long-term optimization loop.

Here, the example of dry-down was taken mostly in isolation with its own optimization, but in most embodiments, the irrigation interacts with many more parameters (as already alluded to above), adding to the complexity of decision-making. That is, both the optimal long-term irrigation targets and the short-term optimal irrigation actions may depend on (and influence) the optimization of other environmental parameters. For example, when artificial lights are turned on, the dry-down rate will increase and more irrigation shots may be used to achieve the same relative saturation.

Figure 9A:
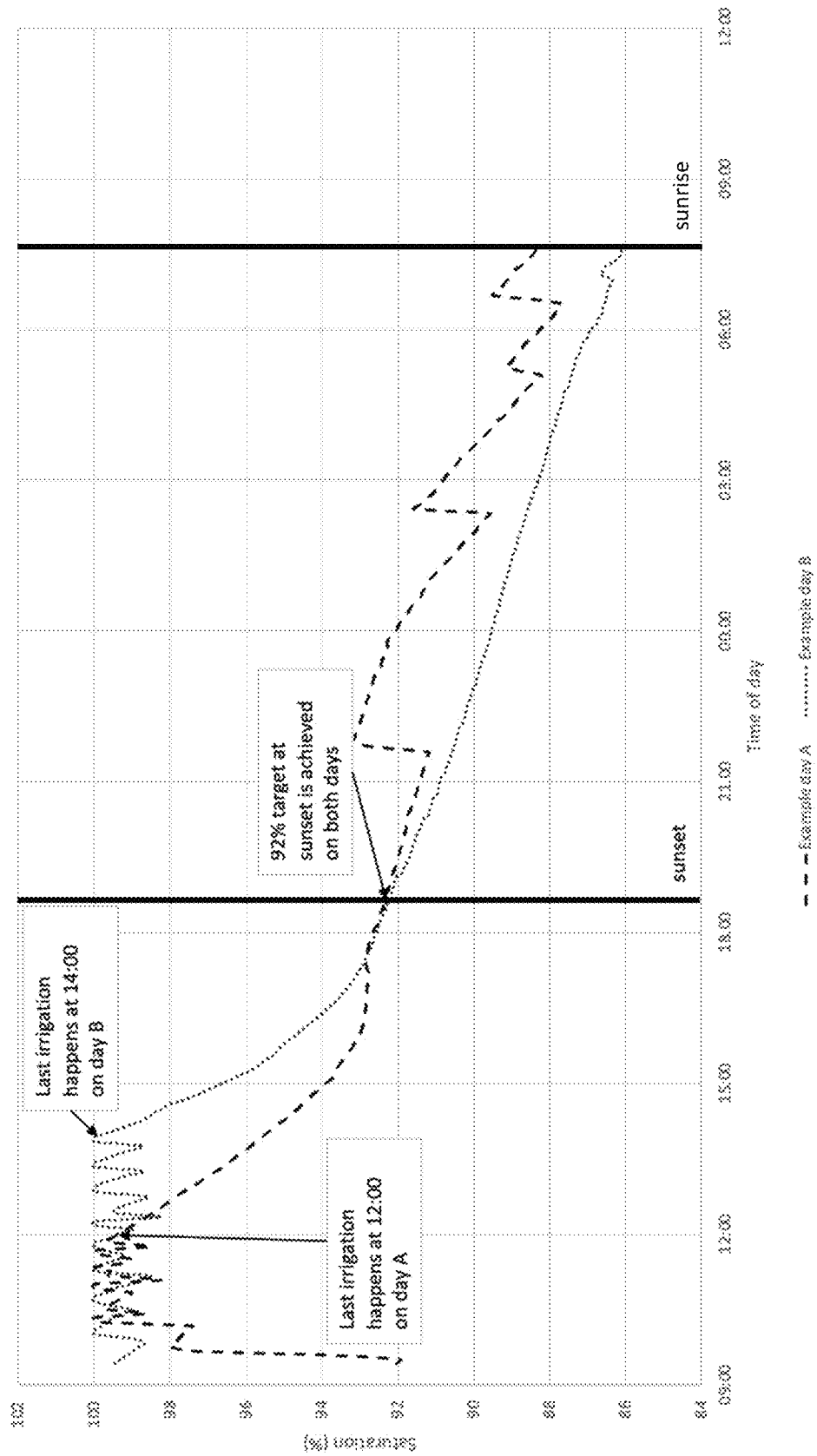
FIG. 9A depicts a relative saturation of a substrate optimized according to an embodiment.
Figure 9B:
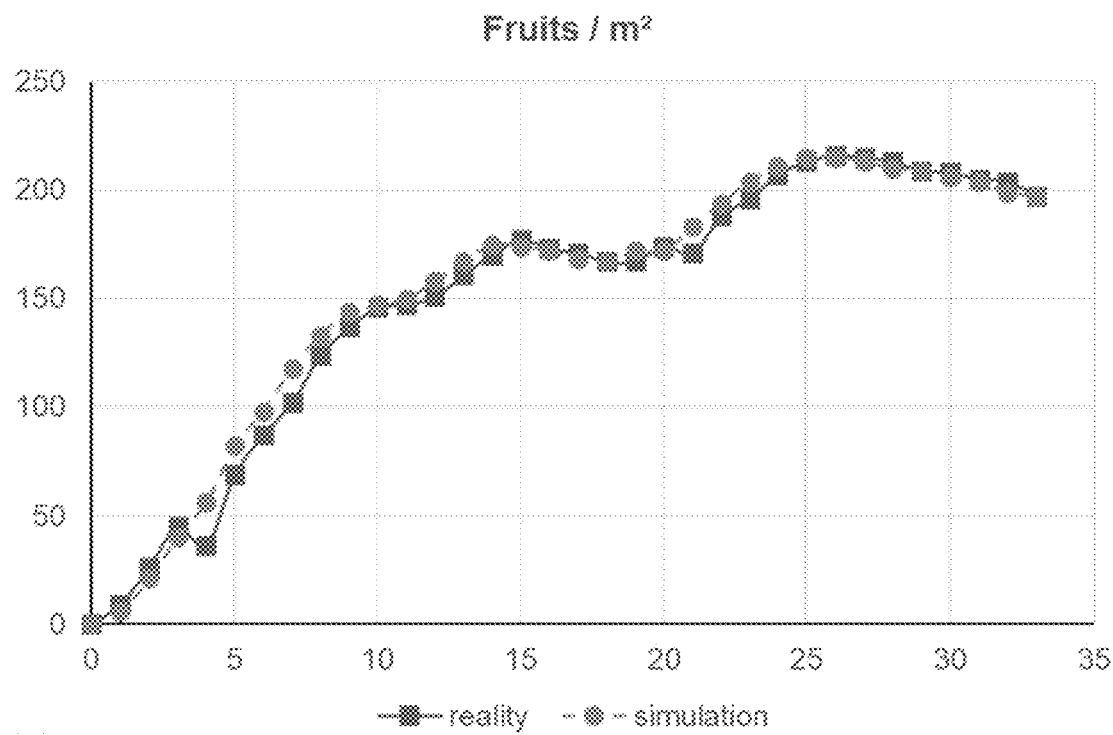
FIGS. 9B and 9C depict results of a growth and development curve for a harvestable part and a productive part of a fruit-bearing plant, respectively.
Figure 9C:
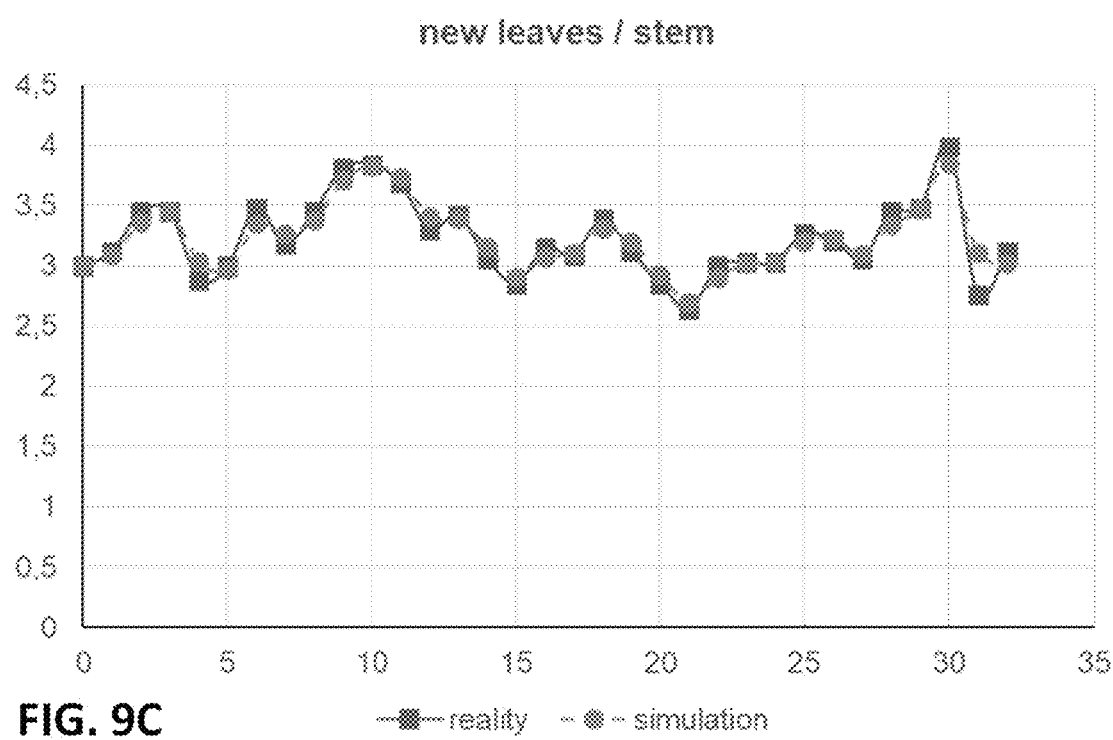

FIGS. 9B and 9C depict results of growth and development curve for a harvestable and a productive part of a fruit-bearing plant, respectively. In particular, FIG. 9B depicts a comparison between a simulated and measured number of fruits per square meter as a function of the number of weeks. The squares represent actual measurements, whereas the circles represent simulations; the solid and dashed lines, respectively, are just a guide to the eye. The graph shows part of a growth cycle starting in late November. The plants, in this case tomato plants, are brought into the greenhouse from a nursery when they start to flower, and do not bear any fruits yet; hence, both graphs start at 0. During the first couple of weeks, the number of fruits steadily grows, and after about 7-8 weeks, the first fruits are being harvested. As a result, the growth of the number of fruits per square meter slows down. Around February, the plants are allowed to bear more fruits, to capitalise on the (expected) increasing outside temperatures and daylight hours. A few weeks later, the increased harvest picks up, and the number of fruits stabilises again. A few weeks later, this is repeated.

It can be seen that the simulation follows the reality fairly closely. The unexpected set-back in week 4, however, was not captured by the model. In this example, the model used as inputs both environmental parameters (including temperature) and labor actions. The number of harvested fruits was determined by simulating the ripeness of the fruits and assuming the fruits are being harvested when they are ripe.

FIG. 9C depicts a comparison between a simulated and measured number of new leaves per stem as a function of the number of weeks. The squares represent actual measurements, whereas the circles represent simulations; the solid and dashed lines, respectively, are just a guide to the eye. The same growth cycle is shown as in FIG. 9B, and the same model inputs are used. Again, the simulation follows the reality fairly closely.

Figure 9D:
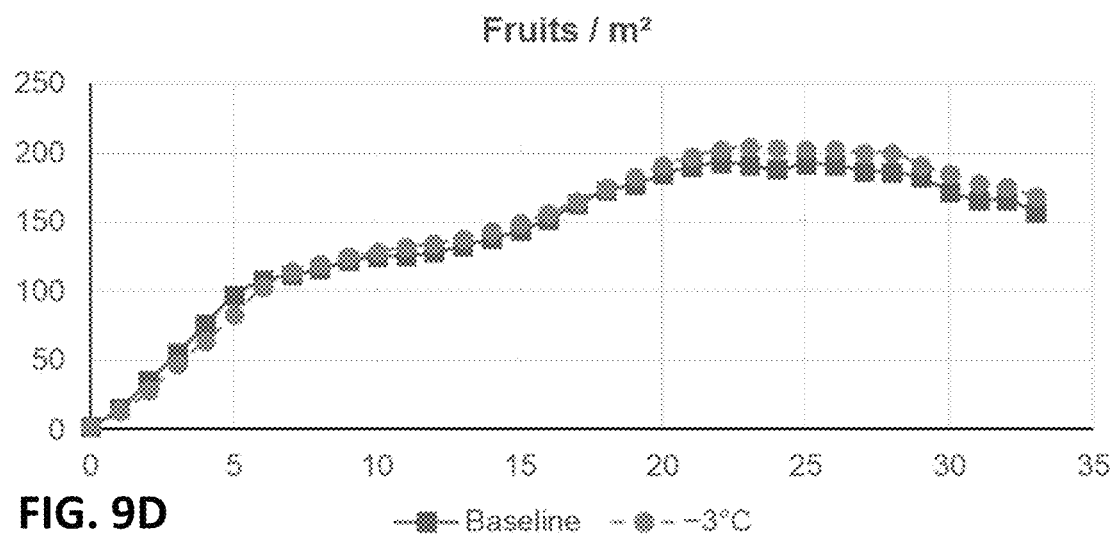
FIG. 9D-9F show the effect of a decrease in temperature on the harvestable part of a plant.
Figure 9E:
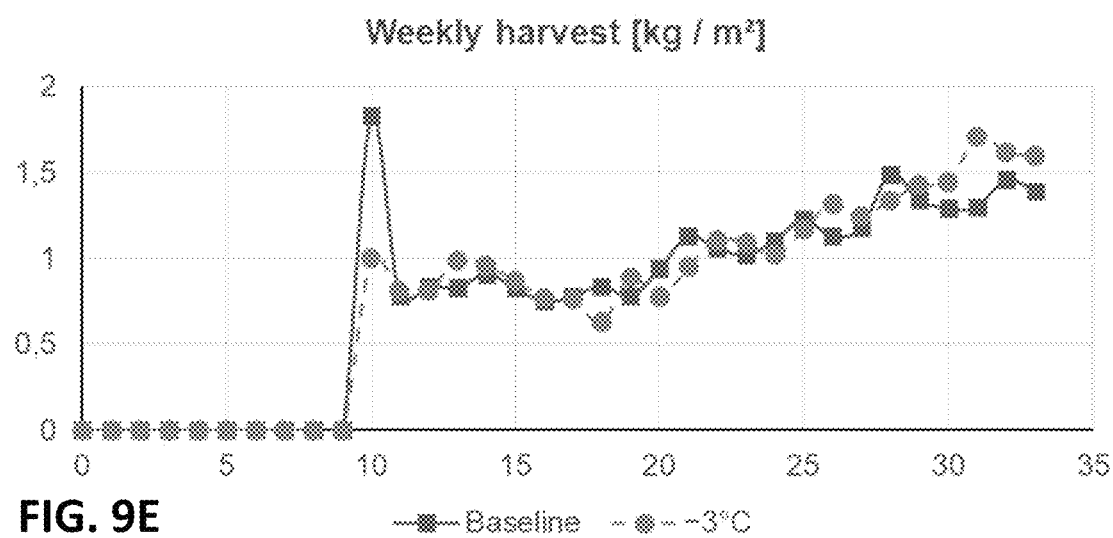
Figure 9F:
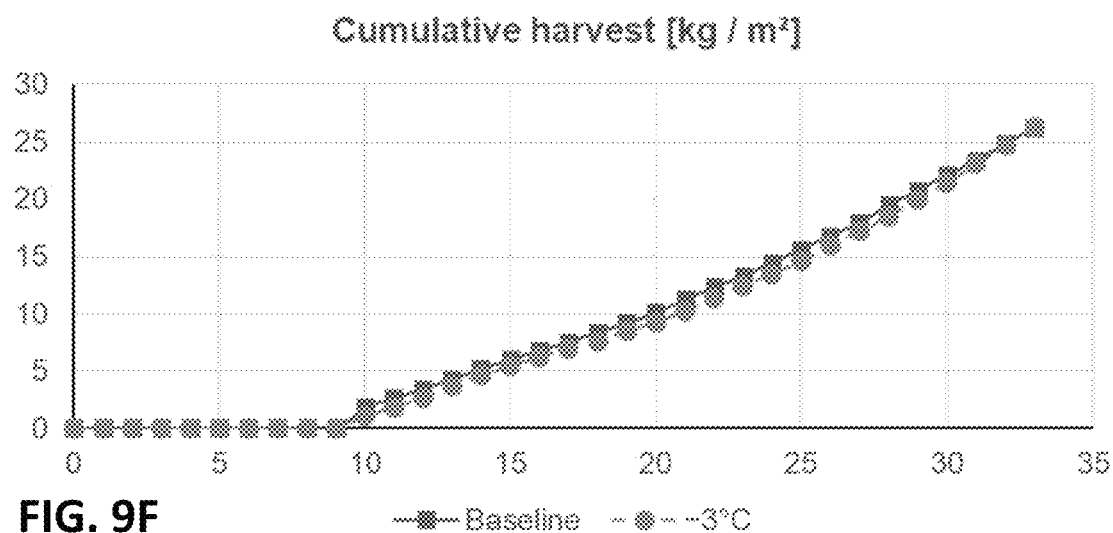

FIG. 9D-9F show the effect of a decrease in temperature on the harvestable part of a plant. The same model is used as in the previous examples, and the simulations again relate to tomato plants. The baseline (squares) is based on a fairly typical growth recipe, and is compared with an alternative scenario with a consistently 3° C. lower temperature (circles). The respective solid and dashed lines are just a guide to the eye.

FIG. 9D shows the number of fruits per square meter. In general, a higher temperature leads to a faster development of the fruits, causing the initial increase in the number of fruits per square meter to be larger, but also causing the fruits to be harvestable sooner. Consequently, despite the initially smaller number of fruits per square meter in the scenario with the decreased temperature, on the long term, this number can become equal to or even higher than in the case with the (higher) baseline temperature. Evidently, a decrease in temperature is also related to a decrease in energy usage, and potentially to a decrease in water usage and $CO_2$ usage.

FIG. 9E shows the weekly harvest in kilogram per square meter for the same two scenarios. Because of the faster ripening, the baseline scenario has a relatively high harvest in the first week of the harvest, but in the following weeks, the harvest tends to be roughly equal. In the last few weeks, the harvest of the scenario with the decreased temperature is higher than that for the baseline scenario. It is noted that because of the lower temperature, the tomatoes take longer to ripen, consequently spending more time on the tomato plants, and may therefore be larger (but fewer) than in the baseline scenario.

FIG. 9F shows the cumulative harvest. The baseline scenario starts with a larger harvest, but at the end of the modelled period, the cumulative harvest is essentially equal. Thus, this model shows that, for these particular scenarios, the scenario with the lower temperature (and hence lower energy usage) may result in an equal cumulative harvest in kilogram tomatoes per square meter. In a typical optimization case, many such curves are determined, and an optimal curve is chosen based on criteria encoded in the objective function.

Figure 10:
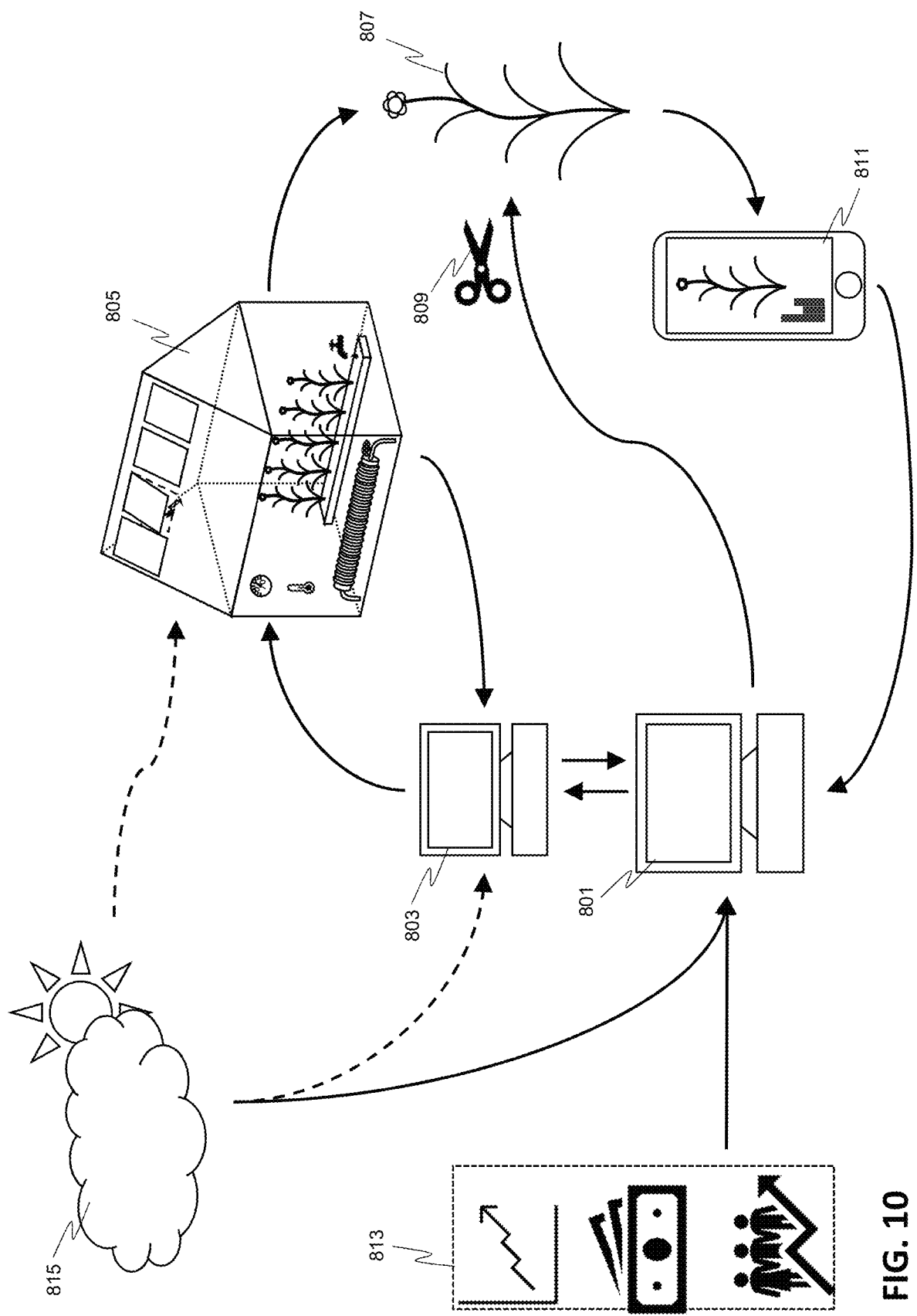
FIG. 10 schematically depicts a system according to an embodiment.

FIG. 10 schematically depicts a system according to an embodiment. Various parts of the method may be executed by different devices. In the current example, only climate and irrigation aspects of the greenhouse environment are discussed. However, similar considerations apply to other environmental aspects, such as pest control, pollination, et cetera. In a typical situation, climate actuators in a greenhouse 805 are controlled by a climate computer 803, and similarly, irrigation actuators may be controlled by an irrigation computer. The climate computer and the irrigation computer may share hardware and/or software. Sensor data related to the greenhouse environment may be fed back to the climate and/or irrigation computer.

In the depicted embodiment, the climate and/or irrigation computer 803 receives input from a control system 801. This input may comprise greenhouse control instructions as defined above with reference to FIG. 2, e.g., rules defining how to operate the climate and/or irrigation actuators. The rules may be conditional rules based on, e.g., the sensor data and/or data relating to the outside weather 815, which may directly or indirectly influence the greenhouse environment. The climate and/or irrigation computer 803 may also provide feedback to the control system, e.g., the sensor data and/or actuator status data.

The control system 801 comprises a processor, e.g. a microprocessor, and a memory, coupled to the processor. The memory contains executable instructions to be executed by the control system, causing the control system to perform one or more method steps as described herein. An example of a control system is described below with reference to FIG. 11.

The climate and/or irrigation computer 803 and the control system 801 may share hardware and/or software. In some embodiments, the control system may be communicatively connected to a plurality of climate and/or irrigation computers, each climate and/or irrigation computer controlling the actuators of, e.g., one or more greenhouses or a part of a greenhouse. There may be different climate computers for different parts of the climate system, e.g., one computer for controlling the heating and another computing for controlling the windows, and similar for the irrigation computer.

In other embodiments, the control system 801 is also configured to directly control the climate and/or irrigation actuators in one or more greenhouses 805. In such embodiments, the control system simultaneously acts as the climate and/or irrigation computer 803.

The greenhouse environment may affect the growth and development of one or more plants 807 being grown in the greenhouse 805. These plants may be indeterminate crops, having a plurality of harvests per crop cycle. The growth and development of the plants may also be affected by plant actions 809, such as seeding, pruning, or harvesting. The plant actions may be determined by the control system 801.

The plant actions may be performed by, e.g., human laborers and/or automated systems. In the latter case, the automated systems may be controlled wholly or partially by the control system.

In the depicted embodiment, the growth and development of the plants 807 is recorded using a mobile computing device 811, e.g., a tablet computer or mobile phone. Plant status observations may be input in the mobile computing device by a human observer, e.g., by filling out a form or responding to questions. In other embodiments, plant sensor data may additionally or alternatively be used, e.g., image data, spectral data, et cetera. The plant status observations may be provided as input to the control system 801.

The control system 801 may further receive external data as input, such as long-term and short-term price data for resources and produce, labor availability and costs, current weather data and weather forecasts, et cetera. Based on these input data, the control system may determine optimized greenhouse control instructions which are provided to the climate and/or irrigation computer 803, and optimized labor actions 809.

Figure 11:
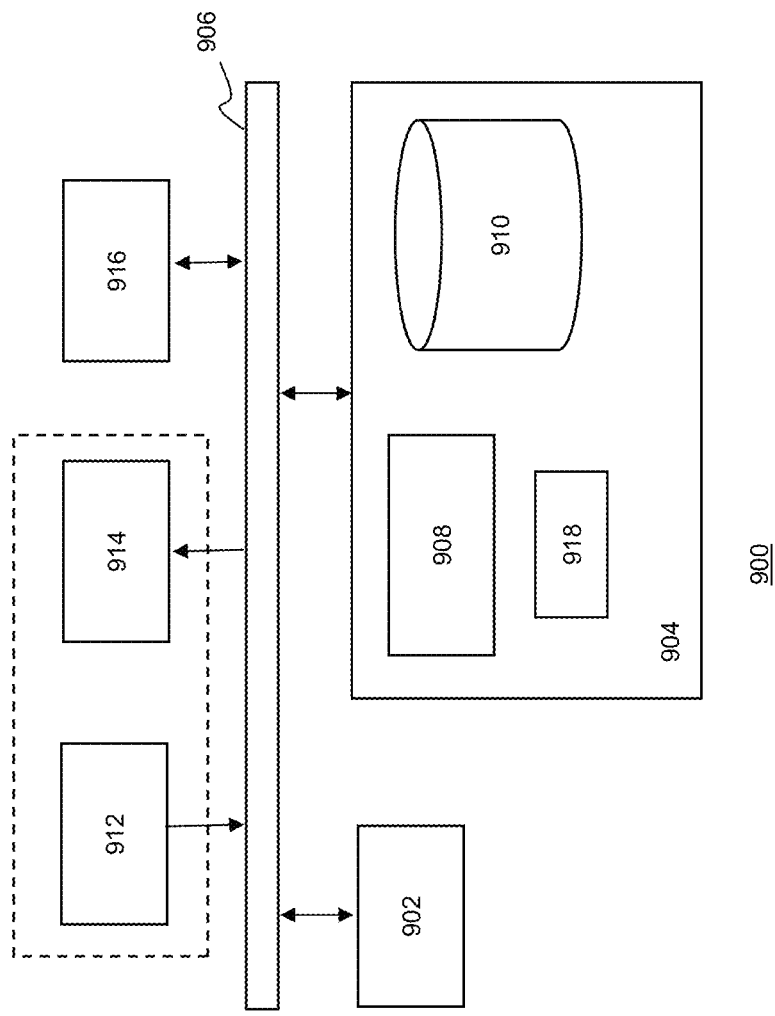
FIG. 11 depicts a block diagram illustrating an exemplary data processing system configured to perform one or more method steps according to an embodiment.

FIG. 11 depicts a block diagram illustrating an exemplary data processing system that may perform the method as described with reference to FIGS. 1-7. The data processing system 900 shown in FIG. 11 may be embodied in, e.g., the control system 1 as shown in FIG. 1, or the control system 801 as shown in FIG. 10. Similarly, the climate and/or irrigation computer 803 and/or the mobile computing device 811 may be implemented as one or more (further) data processing systems as shown in FIG. 11.

As shown in FIG. 11, the data processing system 900 may include at least one processor 902 coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within this specification. The data processing system may be an Internet/cloud server, for example.

The memory elements 904 may include one or more physical memory devices such as, for example, local memory 908 and one or more bulk storage devices 910. The local memory may refer to random access memory or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the quantity of times program code must be retrieved from the bulk storage device 910 during execution. The processing system 900 may also be able to use memory elements of another processing system, e.g. if the processing system 900 is part of a cloud-computing platform.

Input/output (I/O) devices depicted as an input device 912 and an output device 914 optionally can be coupled to the data processing system. Examples of input devices may include, but are not limited to, a keyboard, a pointing device such as a mouse, a microphone (e.g. for voice and/or speech recognition), or the like, and further including the aforementioned sensors such as but not limited to the plurality of thermometers $25_{1-n}$, the plurality of hygrometers $27_{1-n}$, light sensors, gas sensors such as $CO_2$ sensors, microphones, et cetera. Examples of output devices may include, but are not limited to, a monitor or a display, speakers, or the like, and further including one or more actuators operating one or more parts of a greenhouse environment installation such as one or more of the plurality of actuators 15 for the (roof) windows $13_{1-n}$, the actuator 19 for the heating system 17, the actuator 23 for the irrigation system 21 and/or actuators operating (further) aspects of the greenhouse affecting the greenhouse environment, e.g., screens, lighting, nutrients, $CO_2$ release systems, insect release systems, side windows, loudspeakers, et cetera. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 916 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

As pictured in FIG. 11, the memory elements 904 may store an application 918. In various embodiments, the application 918 may be stored in the local memory 908, the one or more bulk storage devices 910, or separate from the local memory and the bulk storage devices. It should be appreciated that the data processing system 900 may further execute an operating system (not shown in FIG. 11) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

Various embodiments may be implemented as a program product for use with a computer system, where the program (s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 902 described herein.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the invention. The embodiments were chosen and described in order to best explain the principles and the practical application, and to enable others of ordinary skill in the art to understand the various embodiments with various modifications as are suited to the particular use contemplated.

What is claimed is:

1. A computer-implemented method for optimizing control of a greenhouse environment installation of a greenhouse, the method comprising:
    determining, with a data processing system having a processor and a memory communicatively coupled to the processor, environmental targets for a greenhouse environment in the greenhouse, the determination of the environmental targets comprising:
        receiving, by the data processing system, plant status data indicative of observable characteristics of one or more plants comprising, at a current and/or future point in time, a harvestable part and a productive part, at least in part distinct from the harvestable part, the one or more plants being grown in the greenhouse;
        updating a plant growth and development model in the memory of the data processing system based on the plant status data, the plant growth and development model being configured to generate with the processor a prediction for a growth and development of the plant;
        receiving, by the data processing system, one or more long-term constraints indicative of long-term predictions of a first set of external circumstances; and
        determining the environmental targets with the data processing system, based on, at least, the prediction for the growth and development of the plant, and the one or more long-term constraints;
    determining environmental actions for the greenhouse environment installation with the data processing system based on the determined environmental targets, the determination of the environmental actions comprising:
        receiving, by the data processing system, one or more short-term constraints indicative of current values and/or short-term predictions of a second set of external circumstances;
        receiving, by the data processing system, sensor data indicative of the greenhouse environment; and
        determining the environmental actions with the data processing system based on, at least, the environmental targets, the one or more short-term constraints, and the sensor data, the environmental actions comprising rules for operating the greenhouse environment installation;
    wherein the determination of the environmental targets and the determination of the environmental actions comprises extremising with the processor at least one objective function, the at least one objective function, for the determination for the environmental targets, being a function of the prediction for the growth and development of the plant;
    sending control signals to a controller of the greenhouse environment installation, the control signals configuring the controller to cause the greenhouse environment installation to perform the environmental actions; and
    the controller of the greenhouse environment installation, in response to receiving the control signals, effectuating the determined environmental actions.

2. The method as claimed in claim 1, wherein the determination of the environmental targets comprises optimizing a long-term optimization loop by extremising a first objective function based on first objectives, the first objectives being based on the prediction for the growth and development of the plant, and wherein the determination of the environmental actions comprises optimizing a short-term optimization loop by extremising a second objective function based on second objectives, different from the first objectives.

3. The method as claimed in claim 1, wherein the determination of the environmental targets and the determination of the environmental actions comprises optimizing a single objective function.

4. The method as claimed in claim 1, further comprising determining plant actions based on the plant status data and/or on the prediction for the growth and development of the plant and on the one or more long-term constraints, and wherein the environmental targets are based on the plant actions and/or wherein the plant actions are based on the environmental targets.

5. The method as claimed in claim 1, wherein extremising the objective function comprises estimating a value of the objective function using a machine learning model, the machine learning model being trained on simulations of the response of the one or more plants, or parts thereof, to the greenhouse environment.

6. The method as claimed in claim 5, wherein the machine learning model is further trained on plant actions performed on the one or more plants.

7. The method as claimed in claim 1, wherein the one or more plants are an indeterminate crop.

8. The method as claimed in claim 1, wherein the determination of the environmental targets comprises determining a target temperature, wherein receiving sensor data indicative of the greenhouse environment comprises receiving temperature data from a temperature sensor, and wherein the determination of the environmental actions comprises determining one or more of: controlling a heating of the greenhouse, controlling windows of the greenhouse, controlling window screens of the greenhouse, and controlling artificial radiation in the greenhouse.

9. The method as claimed in claim 1, wherein the determination of the environmental targets comprises determining target irrigation quantities, wherein receiving sensor data indicative of the greenhouse environment comprises receiving a relative saturation from a saturation sensor, and wherein the determination of the environmental actions comprises determining one or more of: controlling an irrigation system of the greenhouse.

10. The method as claimed in claim 1, wherein the determination of the environmental targets comprises determining a spectrally resolved daily light integral to be received by the one or more plants and wherein the determination of the environmental actions comprises determining a target spectral distribution for one or more artificial radiation sources providing artificial radiation to the one or more plants.

11. A control system for optimizing control of a greenhouse environment installation of a greenhouse, the control system comprising at least one processor configured to:
    determine environmental targets for a greenhouse environment in the greenhouse, the determination of the environmental targets comprising:
        receiving plant status data indicative of observable characteristics of one or more plants comprising, at a current and/or future point in time, a harvestable part and a productive part, the one or more plants being grown in the greenhouse;
        updating a plant growth and development model based on the plant status data, the plant growth and development model being configured to generate a prediction for a growth and development of the plant;
        receiving one or more long-term constraints indicative of long-term predictions of a first set of external circumstances; and
        determining the environmental targets, based on, at least, the prediction for the growth and development of the plant and the one or more long-term constraints;
    determine environmental actions for the greenhouse environment installation based on the determined environmental targets, the determination of the environmental actions comprising:
        receiving one or more short-term constraints indicative of current values and/or short-term predictions of a second set of external circumstances;
        receiving sensor data indicative of the greenhouse environment; and
        determining the environmental actions based on, at least, the environmental targets, the one or more short-term constraints, and the sensor data, the environmental actions comprising rules for operating the greenhouse environment installation;
        wherein the determination of the environmental targets and the determination of the environmental actions comprises extremising at least one objective function, the at least one objective function, for the determination for the environmental targets, being a function of the prediction for the growth and development of the harvestable plant; and
    operate the greenhouse environment installation based on the determined environmental actions.

12. The control system as claimed in claim 11,
    wherein the determination of the environmental targets comprises optimizing a long-term optimization loop by extremising a first objective function based on first objectives, the first objectives being based on the prediction for the growth and development of the plant, and
    wherein the determination of the environmental actions comprises optimizing a short-term optimization loop by extremising a second objective function based on second objectives, different from the first objectives.

13. The control system as claimed in claim 11, wherein the determination of the environmental targets and the determination of the environmental actions comprises optimizing a single objective function.

14. The control system as claimed in claim 11, wherein the at least one processor is further configured to:
    determine plant actions based on the plant status data and/or on the prediction for the growth and development of the plant and on the one or more long-term constraints, and
    wherein the environmental targets are based on the plant actions and/or wherein the plant actions are based on the environmental targets.

15. A non-transient computer-readable storage medium storing instructions which, when executed by at least one computer, cause the computer to control a greenhouse environment installation of a greenhouse, the execution of the instructions configuring the at least one computer to:
    determine environmental targets for a greenhouse environment in the greenhouse, the determination of the environmental targets comprising:
        receiving plant status data indicative of observable characteristics of one or more plants comprising, at a current and/or future point in time, a harvestable part and a productive part, at least in part distinct from the harvestable part, the one or more plants being grown in the greenhouse;
        updating a plant growth and development model based on the plant status data, the plant growth and development model being configured to generate a prediction for a growth and development of the plant;
        receiving one or more long-term constraints indicative of long-term predictions of a first set of external circumstances; and
        determining the environmental targets, based on, at least, the prediction for the growth and development of the plant, and the one or more long-term constraints;
    determine environmental actions for the greenhouse environment installation based on the determined environmental targets, the determination of the environmental actions comprising:
        receiving one or more short-term constraints indicative of current values and/or short-term predictions of a second set of external circumstances;
        receiving sensor data indicative of the greenhouse environment; and
        determining the environmental actions based on, at least, the environmental targets, the one or more short-term constraints, and the sensor data, the environmental actions comprising rules for operating the greenhouse environment installation;
        wherein the determination of the environmental targets and the determination of the environmental actions comprises extremising at least one objective function, the at least one objective function, for the determination for the environmental targets, being a function of the prediction for the growth and development of the plant;

send control signals to a controller of the greenhouse environment installation, the control signals configuring the controller to cause the greenhouse environment installation to perform the environmental actions; and operate the greenhouse environment installation based on the determined environmental actions.

16. The non-transient computer-readable storage medium as claimed in claim 15, wherein the determination of the environmental targets comprises optimizing a long-term optimization loop by extremising a first objective function based on first objectives, the first objectives being based on the prediction for the growth and development of the plant, and wherein the determination of the environmental actions comprises optimizing a short-term optimization loop by extremising a second objective function based on second objectives, different from the first objectives.

17. The non-transient computer-readable storage medium as claimed in claim 15, wherein the determination of the environmental targets and the determination of the environmental actions comprises optimizing a single objective function.

18. The non-transient computer-readable storage medium as claimed in claim 15, wherein the execution of the instructions further configure the computer to:

determine plant actions based on the plant status data and/or on the prediction for the growth and development of the plant and on the one or more long-term constraints, and wherein the environmental targets are based on the plant actions and/or wherein the plant actions are based on the environmental targets.

* * * * *